US010716269B2

(12) United States Patent
Ersavas et al.

(10) Patent No.: US 10,716,269 B2
(45) Date of Patent: *Jul. 21, 2020

(54) METHODS AND SYSTEMS FOR IRRIGATION CONTROL

(71) Applicant: Rain Bird Corporation, Azusa, CA (US)

(72) Inventors: Bulut F. Ersavas, Montrose, CA (US); Semih Pekol, Istanbul (TR); Atakan Bodur, Istanbul (TR)

(73) Assignee: Rain Bird Corporation, Azusa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/452,397

(22) Filed: Jun. 25, 2019

(65) Prior Publication Data

US 2019/0307084 A1    Oct. 10, 2019

Related U.S. Application Data

(63) Continuation of application No. 14/970,349, filed on Dec. 15, 2015, now Pat. No. 10,362,739, which is a
(Continued)

(51) Int. Cl.
*H04W 4/70* (2018.01)
*A01G 25/02* (2006.01)
(Continued)

(52) U.S. Cl.
CPC ............. *A01G 25/023* (2013.01); *A01G 2/00* (2018.02); *A01G 25/16* (2013.01); *A01G 25/167* (2013.01);
(Continued)

(58) Field of Classification Search
CPC ........ A01G 1/00; A01G 25/16; A01G 25/167; A01G 25/023
See application file for complete search history.

(56) References Cited

U.S. PATENT DOCUMENTS

| | | |
|---|---|---|
| 1,001,593 A | 8/1911 | Hertzberg |
| 5,479,339 A | 12/1995 | Miller |

(Continued)

FOREIGN PATENT DOCUMENTS

| | | |
|---|---|---|
| CN | 101021729 A | 8/2007 |
| EP | 1798907 | 6/2007 |

(Continued)

OTHER PUBLICATIONS

U.S. Appl. No. 15/616,736, filed Jun. 7, 2017, Pelin Ersavas.
(Continued)

*Primary Examiner* — Pho M Luu
(74) *Attorney, Agent, or Firm* — Fitch, Even, Tabin & Flannery LLP

(57) ABSTRACT

A wireless system is provided for monitoring environmental, soil, or climate conditions and/or controlling irrigation or climate control systems at an agricultural or landscape site. The wireless system includes at least one wireless nodes for monitoring environmental, soil, or climate conditions and/or for controlling one or more irrigation or climate control systems at the site. The wireless system also includes a server computer system located remotely from the site. The server computer system is coupled to the node/s over a communications network for receiving data from and controlling operation of the node/s. The server computer system is also coupled to a device operated by an end-user over a communications network for transmitting the data to and receiving remote control commands or queries from the end-user.

16 Claims, 15 Drawing Sheets

Related U.S. Application Data continuation of application No. 14/466,469, filed on Aug. 22, 2014, now Pat. No. 9,241,451, which is a continuation of application No. 13/844,248, filed on Mar. 15, 2013, now Pat. No. 8,849,461, which is a continuation-in-part of application No. 12/849,488, filed on Aug. 3, 2010, now Pat. No. 8,649,907, which is a continuation of application No. 12/537,772, filed on Aug. 7, 2009, now abandoned.

(51) Int. Cl.
    *A01G 2/00*     (2018.01)
    *H04L 29/08*     (2006.01)
    *A01G 25/16*     (2006.01)
    *G05D 7/06*     (2006.01)
    *B05B 12/04*     (2006.01)
    *G05B 19/042*     (2006.01)

(52) U.S. Cl.
    CPC ............ *B05B 12/04* (2013.01); *G05B 19/042* (2013.01); *G05D 7/0617* (2013.01); *H04L 67/10* (2013.01); *H04W 4/70* (2018.02); *G05B 2219/2625* (2013.01)

(56) References Cited

U.S. PATENT DOCUMENTS

| | | |
|---|---|---|
| 5,621,669 A | 4/1997 | Bjornsson |
| 5,714,931 A | 2/1998 | Petite |
| 5,740,031 A | 4/1998 | Gagnon |
| 5,926,531 A | 7/1999 | Petite |
| 6,028,522 A | 2/2000 | Petite |
| 6,061,603 A | 5/2000 | Papadopoulos |
| 6,079,433 A | 6/2000 | Saarem |
| 6,098,898 A | 8/2000 | Storch |
| 6,218,953 B1 | 4/2001 | Petite |
| 6,233,327 B1 | 5/2001 | Petite |
| 6,430,268 B1 | 8/2002 | Petite |
| 6,437,692 B1 | 8/2002 | Petite |
| 6,529,589 B1 | 3/2003 | Nelson |
| 6,553,336 B1 | 4/2003 | Johnson |
| 6,600,971 B1 | 7/2003 | Smith |
| 6,618,578 B1 | 9/2003 | Petite |
| 6,628,764 B1 | 9/2003 | Petite |
| 6,671,586 B2 | 12/2003 | Davis |
| 6,708,084 B2 | 3/2004 | Battistutto |
| 6,747,557 B1 | 6/2004 | Petite |
| 6,782,310 B2 | 8/2004 | Bailey |
| 6,784,807 B2 | 8/2004 | Petite |
| 6,792,323 B2 | 9/2004 | Krzyzanowski |
| 6,823,239 B2 | 11/2004 | Sieminski |
| 6,836,737 B2 | 12/2004 | Petite |
| 6,853,883 B2 | 2/2005 | Kreikemeier |
| 6,862,498 B2 | 3/2005 | Davis |
| 6,874,707 B2 | 4/2005 | Skinner |
| 6,891,838 B1 | 5/2005 | Petite |
| 6,892,114 B1 | 5/2005 | Addink |
| 6,895,987 B2 | 5/2005 | Addink |
| 6,898,467 B1 | 5/2005 | Smith |
| 6,914,533 B2 | 7/2005 | Petite |
| 6,914,893 B2 | 7/2005 | Petite |
| 6,938,834 B2 | 9/2005 | Harris |
| 6,947,810 B2 | 9/2005 | Skinner |
| 6,950,728 B1 | 9/2005 | Addink |
| 6,963,808 B1 | 11/2005 | Addink |
| 6,978,794 B2 | 12/2005 | Dukes |
| 6,997,642 B2 | 2/2006 | Bishop |
| 7,003,357 B1 | 2/2006 | Kreikemeier |
| 7,010,395 B1 | 3/2006 | Goldberg |
| 7,010,396 B2 | 3/2006 | Ware |
| 7,012,394 B2 | 3/2006 | Moore |
| 7,019,667 B2 | 3/2006 | Petite |
| 7,024,256 B2 | 4/2006 | Krzyzanowski |
| 7,053,767 B2 | 5/2006 | Petite |
| 7,058,478 B2 | 6/2006 | Alexanian |
| 7,063,270 B2 | 6/2006 | Bowers |
| 7,069,115 B1 | 6/2006 | Woytowitz |
| 7,079,810 B2 | 7/2006 | Petite |
| 7,103,511 B2 | 9/2006 | Petite |
| 7,123,993 B1 | 10/2006 | Freeman |
| 7,133,749 B2 | 11/2006 | Goldberg |
| 7,137,550 B1 | 11/2006 | Petite |
| 7,146,254 B1 | 12/2006 | Howard |
| 7,172,366 B1 | 2/2007 | Bishop |
| 7,181,319 B1 | 2/2007 | Woytowtiz |
| 7,182,272 B1 | 2/2007 | Marian |
| 7,184,848 B2 | 2/2007 | Krzyzanowski |
| 7,184,861 B2 | 2/2007 | Petite |
| 7,209,840 B2 | 4/2007 | Petite |
| 7,250,860 B2 | 7/2007 | Smith |
| 7,263,073 B2 | 8/2007 | Petite |
| 7,266,428 B2 | 9/2007 | Alexanian |
| 7,295,128 B2 | 11/2007 | Petite |
| 7,305,280 B2 | 12/2007 | Marian |
| 7,328,089 B2 | 2/2008 | Curren |
| 7,330,796 B2 | 2/2008 | Addink |
| 7,339,957 B2 | 3/2008 | Hitt |
| 7,346,463 B2 | 3/2008 | Petite |
| 7,397,907 B2 | 7/2008 | Petite |
| 7,403,840 B2 | 7/2008 | Moore |
| 7,424,527 B2 | 9/2008 | Petite |
| 7,468,661 B2 | 12/2008 | Petite |
| 7,480,501 B2 | 1/2009 | Petite |
| 7,487,925 B2 | 2/2009 | Skinner |
| 7,546,181 B2 | 6/2009 | Vidovich |
| 7,567,858 B1 | 7/2009 | Dunlap |
| 7,574,284 B2 | 8/2009 | Goldberg |
| 7,584,023 B1 | 9/2009 | Palmer |
| 7,596,429 B2 | 9/2009 | Cardinal |
| 7,619,322 B2 | 11/2009 | Gardner |
| 7,643,823 B2 | 1/2010 | Shamoon |
| 7,650,425 B2 | 1/2010 | Davis |
| 7,668,532 B2 | 2/2010 | Shamoon |
| 7,668,990 B2 | 2/2010 | Krzyzanowski |
| 7,697,492 B2 | 4/2010 | Petite |
| 7,711,454 B2 | 5/2010 | Addink |
| 7,711,796 B2 | 5/2010 | Gutt |
| 7,719,432 B1 | 5/2010 | Hill |
| 7,738,999 B2 | 6/2010 | Petite |
| 7,739,378 B2 | 6/2010 | Petite |
| 7,756,086 B2 | 7/2010 | Petite |
| 7,844,368 B2 | 11/2010 | Alexanian |
| 7,844,369 B2 | 11/2010 | Nickerson |
| 7,870,080 B2 | 1/2011 | Budike, Jr. |
| 7,877,168 B1 | 1/2011 | Porter |
| 7,883,027 B2 | 2/2011 | Fekete |
| 7,899,580 B2 | 3/2011 | Cardinal |
| 7,911,341 B2 | 3/2011 | Raji |
| 7,930,069 B2 | 4/2011 | Savelle |
| 7,933,945 B2 | 4/2011 | Krzyzanowski |
| 7,953,517 B1 | 5/2011 | Porter |
| 7,962,101 B2 | 6/2011 | Vaswani |
| 7,962,244 B2 | 6/2011 | Alexanian |
| 7,978,059 B2 | 7/2011 | Petite |
| 7,996,115 B2 | 8/2011 | Nickerson |
| 8,013,732 B2 | 9/2011 | Petite |
| 8,019,482 B2 | 9/2011 | Sutardja |
| 8,024,075 B2 | 9/2011 | Fekete |
| 8,031,650 B2 | 10/2011 | Petite |
| 8,042,049 B2 | 10/2011 | Killian |
| 8,055,389 B2 | 11/2011 | Holindrake |
| 8,064,412 B2 | 11/2011 | Petite |
| 8,064,935 B2 | 11/2011 | Shamoon |
| 8,104,993 B2 | 1/2012 | Hitt |
| 8,116,889 B2 | 2/2012 | Krzyzanowski |
| 8,145,360 B2 | 3/2012 | Brundisini |
| 8,171,136 B2 | 5/2012 | Petite |
| 8,193,930 B2 | 6/2012 | Petite |
| 8,196,064 B2 | 6/2012 | Krzyzanowski |
| 8,209,061 B2 | 6/2012 | Palmer |
| 8,212,667 B2 | 7/2012 | Petite |
| 8,214,496 B2 | 7/2012 | Gutt |
| 8,219,254 B2 | 7/2012 | O'Connor |

(56) References Cited

U.S. PATENT DOCUMENTS

| | | |
|---|---|---|
| 8,219,935 B2 | 7/2012 | Hunts |
| 8,223,010 B2 | 7/2012 | Petite |
| 8,224,493 B2 | 7/2012 | Walker |
| 8,225,810 B2 | 7/2012 | Blanchard |
| 8,244,404 B2 | 8/2012 | Nickerson |
| 8,265,797 B2 | 9/2012 | Nickerson |
| 8,301,309 B1 | 10/2012 | Woytoxitz |
| 8,326,440 B2 | 12/2012 | Christfort |
| 8,335,304 B2 | 12/2012 | Petite |
| 8,335,842 B2 | 12/2012 | Raji |
| 8,374,726 B2 | 2/2013 | Holindrake |
| 8,379,564 B2 | 2/2013 | Petite |
| 8,396,606 B2 | 3/2013 | Forbes, Jr. |
| 8,401,705 B2 | 3/2013 | Alexanian |
| 8,410,931 B2 | 4/2013 | Petite |
| 8,412,382 B2 | 4/2013 | Imes |
| 8,417,390 B2 | 4/2013 | Nickerson |
| 8,433,448 B2 | 4/2013 | Walker |
| 8,437,879 B2 | 5/2013 | Anderson |
| 8,446,884 B2 | 5/2013 | Petite |
| 8,447,843 B2 | 5/2013 | Johnson |
| 8,457,798 B2 | 6/2013 | Hackett |
| 8,478,871 B2 | 7/2013 | Gutt |
| 8,494,683 B2 | 7/2013 | Piper |
| 8,516,087 B2 | 8/2013 | Wilson |
| 8,527,549 B2 | 9/2013 | Cidon |
| 8,528,834 B2 | 9/2013 | Skinner |
| 8,538,592 B2 | 9/2013 | Alexanian |
| 8,548,632 B1 | 10/2013 | Porter |
| 8,565,904 B2 | 10/2013 | Bragg et al. |
| 8,600,569 B2 | 12/2013 | Woytowitz |
| 8,606,415 B1 | 12/2013 | Woytowitz |
| 8,620,480 B2 | 12/2013 | Alexanian |
| 8,620,481 B2 | 12/2013 | Holindrake |
| 8,630,743 B2 | 1/2014 | Marsters |
| 8,635,350 B2 | 1/2014 | Gutt |
| 8,649,907 B2 * | 2/2014 | Ersavas ............... A01G 25/167 700/275 |
| 8,650,069 B2 | 2/2014 | Mason, Sr. |
| 8,660,705 B2 | 2/2014 | Woytowitz |
| 8,700,222 B1 | 4/2014 | Woytowitz |
| 8,712,592 B2 | 4/2014 | Carlson |
| 8,738,188 B2 | 5/2014 | Nickerson |
| 8,738,189 B2 | 5/2014 | Alexanian |
| 8,739,830 B2 | 6/2014 | Bradbury |
| 8,751,052 B1 | 6/2014 | Campbell |
| 8,793,024 B1 | 7/2014 | Woytowitz |
| 8,812,007 B2 | 8/2014 | Hitt |
| 8,839,135 B2 | 9/2014 | Vander Griend |
| 8,849,461 B2 * | 9/2014 | Ersavas ............... A01G 25/167 700/275 |
| 8,862,277 B1 | 10/2014 | Campbell |
| 8,880,204 B2 | 11/2014 | Frei |
| 8,890,505 B2 | 11/2014 | Forbes, Jr. |
| 8,924,587 B2 | 12/2014 | Petite |
| 8,924,588 B2 | 12/2014 | Petite |
| 8,924,891 B2 | 12/2014 | Hunts |
| 8,930,032 B2 | 1/2015 | Shupe |
| 8,948,921 B2 | 2/2015 | Halahan |
| 8,977,400 B1 | 3/2015 | Porter |
| 8,996,183 B2 | 3/2015 | Forbes, Jr. |
| 9,032,998 B2 | 5/2015 | O'Brien |
| 9,043,036 B2 | 5/2015 | Fekete |
| 9,069,337 B2 | 6/2015 | Forbes, Jr. |
| 9,130,402 B2 | 9/2015 | Forbes, Jr. |
| 9,131,642 B2 | 9/2015 | Groeneveld |
| 9,149,013 B2 | 10/2015 | Andrews |
| 9,183,163 B2 | 11/2015 | Frei |
| 9,192,110 B2 | 11/2015 | Standerfer |
| 9,201,815 B2 | 12/2015 | Frei |
| 9,208,676 B2 | 12/2015 | Fadell |
| 9,241,451 B2 * | 1/2016 | Ersavas ............... A01G 25/167 |
| 9,288,102 B2 | 3/2016 | Sobhy |
| 9,301,460 B2 | 4/2016 | Runge |
| 9,348,338 B2 | 5/2016 | Nickerson |
| 9,425,978 B2 | 8/2016 | Frei |
| 9,602,655 B2 | 3/2017 | Shamoon |
| 9,678,485 B2 | 6/2017 | Malaugh |
| 9,703,275 B2 | 7/2017 | Ersavas |
| 9,704,122 B2 | 7/2017 | Jung |
| 9,733,274 B2 | 8/2017 | Pietrowicz |
| 9,756,797 B2 | 9/2017 | Sarver |
| 9,763,393 B2 | 9/2017 | Parsons |
| 9,766,609 B2 | 9/2017 | Kah, Jr. |
| 9,781,887 B2 * | 10/2017 | Woytowitz ............ A01G 25/167 |
| 9,800,463 B2 | 10/2017 | Imes |
| 9,814,190 B1 | 11/2017 | Stange |
| 9,829,869 B2 * | 11/2017 | Ersavas ................. G05B 15/02 |
| 9,832,939 B2 | 12/2017 | Russell |
| 9,872,445 B2 | 1/2018 | Cline |
| 10,362,739 B2 * | 7/2019 | Ersavas ................ A01G 25/023 |
| 2001/0002210 A1 | 5/2001 | Petite |
| 2001/0024163 A1 | 9/2001 | Petite |
| 2002/0012323 A1 | 1/2002 | Petite |
| 2002/0013679 A1 | 1/2002 | Petite |
| 2002/0019712 A1 | 2/2002 | Petite |
| 2002/0019725 A1 | 2/2002 | Petite |
| 2002/0027504 A1 | 3/2002 | Davis |
| 2002/0031101 A1 | 3/2002 | Petite |
| 2002/0109608 A1 | 8/2002 | Petite |
| 2002/0125998 A1 | 9/2002 | Petite |
| 2002/0169643 A1 | 11/2002 | Petite |
| 2003/0036810 A1 | 2/2003 | Petite |
| 2003/0036822 A1 | 2/2003 | Davis |
| 2003/0067889 A1 | 4/2003 | Petite |
| 2003/0078029 A1 | 4/2003 | Petite |
| 2003/0093159 A1 | 5/2003 | Sieminski |
| 2003/0093484 A1 | 5/2003 | Petite |
| 2003/0179102 A1 | 9/2003 | Barnes |
| 2004/0039489 A1 | 2/2004 | Moore |
| 2004/0053639 A1 | 3/2004 | Petite |
| 2004/0088083 A1 | 5/2004 | Davis |
| 2004/0100394 A1 | 5/2004 | Hitt |
| 2004/0183687 A1 | 9/2004 | Petite |
| 2005/0030199 A1 | 2/2005 | Petite |
| 2005/0043059 A1 | 2/2005 | Petite |
| 2005/0043860 A1 | 2/2005 | Petite |
| 2005/0190055 A1 | 9/2005 | Petite |
| 2005/0195768 A1 | 9/2005 | Petite |
| 2005/0195775 A1 | 9/2005 | Petite |
| 2005/0201397 A1 | 9/2005 | Petite |
| 2005/0216580 A1 | 9/2005 | Raji |
| 2005/0243867 A1 | 11/2005 | Petite |
| 2006/0161309 A1 | 7/2006 | Moore |
| 2006/0181406 A1 | 8/2006 | Petite |
| 2007/0016334 A1 | 1/2007 | Smith |
| 2007/0088462 A1 | 4/2007 | Peleg |
| 2007/0135973 A1 | 6/2007 | Petite |
| 2007/0140274 A1 | 6/2007 | Battistutto |
| 2007/0191991 A1 | 8/2007 | Addink |
| 2007/0208521 A1 | 9/2007 | Petite |
| 2007/0239317 A1 | 10/2007 | Bogolea |
| 2007/0286210 A1 | 12/2007 | Gutt |
| 2007/0286369 A1 | 12/2007 | Gutt |
| 2007/0293990 A1 | 12/2007 | Alexanain |
| 2008/0027586 A1 | 1/2008 | Hern |
| 2008/0051036 A1 | 2/2008 | Vaswani |
| 2008/0097653 A1 | 4/2008 | Kaprielian |
| 2008/0119948 A1 | 5/2008 | O'Connor |
| 2008/0136620 A1 | 6/2008 | Lee |
| 2008/0147205 A1 | 6/2008 | Ollis |
| 2008/0157995 A1 | 7/2008 | Crist |
| 2008/0180240 A1 | 7/2008 | Raji |
| 2008/0183842 A1 | 7/2008 | Raji |
| 2008/0199359 A1 | 8/2008 | Davis |
| 2009/0006617 A1 | 1/2009 | Petite |
| 2009/0007706 A1 | 1/2009 | Hitt |
| 2009/0068947 A1 | 3/2009 | Petite |
| 2009/0094097 A1 | 4/2009 | Gardenswartz |
| 2009/0096605 A1 | 4/2009 | Petite |
| 2009/0099701 A1 | 4/2009 | Li |
| 2009/0145974 A1 | 6/2009 | Fekete |
| 2009/0150001 A1 | 6/2009 | Fekete |
| 2009/0150002 A1 | 6/2009 | Fekete |

(56) References Cited

U.S. PATENT DOCUMENTS

| | | |
|---|---|---|
| 2009/0168678 A1 | 7/2009 | Han |
| 2009/0177330 A1 | 7/2009 | Kah |
| 2009/0204265 A1 | 8/2009 | Hackett |
| 2009/0215424 A1 | 8/2009 | Petite |
| 2009/0216345 A1 | 8/2009 | Christfort |
| 2009/0217189 A1 | 8/2009 | Martin |
| 2009/0217194 A1 | 8/2009 | Martin |
| 2009/0223128 A1 | 9/2009 | Kuschak |
| 2009/0243840 A1 | 10/2009 | Petite |
| 2009/0276102 A1 | 11/2009 | Smith |
| 2009/0277506 A1 | 11/2009 | Bradbury |
| 2009/0281672 A1 | 11/2009 | Pourzia |
| 2009/0302870 A1 | 12/2009 | Paterson |
| 2009/0326723 A1 | 12/2009 | Moore |
| 2009/0328176 A1 | 12/2009 | Martin |
| 2010/0038440 A1 | 2/2010 | Ersavas |
| 2010/0082744 A1 | 4/2010 | Raji |
| 2010/0095111 A1 | 4/2010 | Gutt |
| 2010/0095369 A1 | 4/2010 | Gutt |
| 2010/0109685 A1 | 5/2010 | Morton |
| 2010/0147389 A1 | 6/2010 | Blanchard |
| 2010/0152909 A1 | 6/2010 | Hitt |
| 2010/0179701 A1 | 7/2010 | Gilbert |
| 2010/0194582 A1 | 8/2010 | Petite |
| 2010/0198712 A1 | 8/2010 | Benisti |
| 2010/0222932 A1 | 9/2010 | O'Connor |
| 2010/0250054 A1 | 9/2010 | Petite |
| 2010/0251807 A1 | 10/2010 | Morton |
| 2010/0256827 A1 | 10/2010 | Bragg |
| 2010/0265909 A1 | 10/2010 | Petite |
| 2010/0289411 A1 | 11/2010 | Smits |
| 2010/0312881 A1 | 12/2010 | Davis |
| 2010/0324987 A1 | 12/2010 | Benisti |
| 2010/0325005 A1 | 12/2010 | Benisti |
| 2011/0035059 A1 | 2/2011 | Ersavas |
| 2011/0043230 A1 | 2/2011 | Morton |
| 2011/0093123 A1 | 4/2011 | Alexanian |
| 2011/0111700 A1 | 5/2011 | Hackett |
| 2011/0190947 A1 | 8/2011 | Savelle |
| 2011/0190948 A1 | 8/2011 | Fekete |
| 2011/0212700 A1 | 9/2011 | Petite |
| 2011/0238228 A1 | 9/2011 | Woytowitz |
| 2011/0264324 A1 | 10/2011 | Petite |
| 2011/0270448 A1 | 11/2011 | Kantor |
| 2011/0301767 A1 | 12/2011 | Alexanian |
| 2011/0309953 A1 | 12/2011 | Petite |
| 2011/0310929 A1 | 12/2011 | Petite |
| 2011/0320050 A1 | 12/2011 | Petite |
| 2012/0041606 A1 | 2/2012 | Standerfer |
| 2012/0072036 A1 | 3/2012 | Piper |
| 2012/0072037 A1 | 3/2012 | Alexanian |
| 2012/0075092 A1 | 3/2012 | Petite |
| 2012/0078425 A1 | 3/2012 | Gardenswartz |
| 2012/0084115 A1 | 4/2012 | Cline |
| 2012/0092154 A1 | 4/2012 | Petite |
| 2012/0095604 A1 | 4/2012 | Alexanian |
| 2012/0109387 A1 | 5/2012 | Martin |
| 2012/0191261 A1 | 7/2012 | Nickerson |
| 2012/0203383 A1 | 8/2012 | Holindrake |
| 2012/0214532 A1 | 8/2012 | Petite |
| 2012/0221154 A1 | 8/2012 | Runge |
| 2012/0221718 A1 | 8/2012 | Imes |
| 2012/0239807 A1 | 9/2012 | Davis |
| 2012/0239808 A1 | 9/2012 | Davis |
| 2012/0253529 A1 | 10/2012 | Carlson |
| 2012/0266095 A1 | 10/2012 | Killian |
| 2012/0273704 A1 | 11/2012 | O'Connor |
| 2012/0290139 A1 | 11/2012 | Brundisini |
| 2012/0290140 A1 | 11/2012 | Groeneveld |
| 2012/0303168 A1 | 11/2012 | Halahan |
| 2013/0048746 A1 | 2/2013 | Littrell |
| 2013/0060389 A1 | 3/2013 | Marsters |
| 2013/0085619 A1 | 4/2013 | Howard |
| 2013/0110293 A1 | 5/2013 | Illig |
| 2013/0116837 A1 | 5/2013 | Malaugh |
| 2013/0131874 A1 | 5/2013 | Shupe |
| 2013/0162390 A1 | 6/2013 | Ersavas |
| 2013/0190934 A1 | 7/2013 | Holindrake |
| 2013/0207771 A1 | 8/2013 | Ersavas |
| 2013/0226357 A1 | 8/2013 | Ersavas |
| 2013/0274932 A1 | 10/2013 | Curren |
| 2013/0310992 A1 | 11/2013 | Larsen |
| 2013/0318231 A1 | 11/2013 | Raji |
| 2014/0005810 A1 | 1/2014 | Frei |
| 2014/0005843 A1 | 1/2014 | Thomas |
| 2014/0005851 A1 | 1/2014 | Frei |
| 2014/0006506 A1 | 1/2014 | Frei |
| 2014/0018965 A1 | 1/2014 | Pearson |
| 2014/0039696 A1 | 2/2014 | Andrews |
| 2014/0081471 A1 | 3/2014 | Woytowitz |
| 2014/0088770 A1 | 3/2014 | Masters |
| 2014/0129039 A1 | 5/2014 | Olive-Chahinian |
| 2014/0143397 A1 | 5/2014 | Gutt |
| 2014/0172180 A1 | 6/2014 | Woytowitz |
| 2014/0222223 A1 | 8/2014 | Horton |
| 2014/0229024 A1 | 8/2014 | Wang |
| 2014/0236868 A1 | 8/2014 | Cook |
| 2014/0245160 A1 | 8/2014 | Bauer |
| 2016/0135389 A1 | 5/2016 | Ersavas |
| 2017/0322527 A1 | 11/2017 | Ersavas |

FOREIGN PATENT DOCUMENTS

| | | |
|---|---|---|
| ES | 2209614 A1 | 6/2004 |
| TL | 1999039567 | 8/1999 |
| WO | 0235193 A2 | 5/2002 |
| WO | 2007104152 A2 | 9/2007 |
| WO | 2009132425 A1 | 11/2009 |
| WO | 2010019109 | 2/2010 |

OTHER PUBLICATIONS

'PureSense on-line help', https://www.pserm.com/IrrigationManagerHelp/PureSense_Irrigation_Manager.htm, Mar. 24, 2010.

Akyildiz et al., "Wireless sensor networks: a survey," Computer Networks 38 (2002) 393-422.

Intel, "Instrumenting the World: An Introduction to Wireless Sensor Networks," Version 1, Feb. 2004.

Li, "Study on Precision Agriculture Monitoring Framework Based on WSN," Anti-counterfeiting, Security, and Identification, 2nd International Conference, 2008, 182-185.

Nokia, "Machine-to-Machine," White Paper (2004).

PCT; App. No. PCT/TR2009/000103; International Report on Patentability dated Feb. 24, 2011.

PCT; App. No. PCT/TR2009/000103; International Search Report dated Feb. 1, 2010.

PCT; App. No. PCT/TR2009/000103; Written Opinion dated Feb. 12, 2011.

USPTO; U.S. Appl. No. 12/537,772; Office Action dated Mar. 21, 2013.

USPTO; U.S. Appl. No. 12/537,772; Office Action dated Dec. 29, 2011.

USPTO; U.S. Appl. No. 12/849,488; Notice of Allowance dated Feb. 22, 2013.

USPTO; U.S. Appl. No. 12/849,488; Notice of Allowance dated Jul. 3, 2013.

USPTO; U.S. Appl. No. 12/849,488; Notice of Allowance dated Oct. 28, 2013.

USPTO; U.S. Appl. No. 12/849,488; Office Action dated Jun. 22, 2012.

USPTO; U.S. Appl. No. 13/151,269; Office Action dated Jan. 18, 2012.

USPTO; U.S. Appl. No. 13/844,248; Notice of Allowance dated May 22, 2014, 2014.

USPTO; U.S. Appl. No. 14/466,469; Notice of Allowance dated Sep. 11, 2015.

USPTO; U.S. Appl. No. 14/466,469; Office Action dated Dec. 29, 2014.

(56) References Cited

OTHER PUBLICATIONS

USPTO; U.S. Appl. No. 14/970,349; Notice of Allowance dated Mar. 25, 2019; (pp. 1-10).
USPTO; U.S. Appl. No. 14/970,349; Notice of Allowance dated Oct. 2, 2018; (pp. 1-9).
USPTO; U.S. Appl. No. 14/970,349; Office Action dated Feb. 8, 2018; (pp. 1-10).
Zigbee, 'Zigbee Resource Guide—Spring 2008,' 2008, pp. 28-31, Fourier Systems Ltd., New Albany, IN.
Zigbee; 'Zigbee Resource Guide—Spring 2008;' 2008; pp. 1-32; Fourier Systems Ltd.; New Albany, IN.

* cited by examiner

METHODS AND SYSTEMS FOR IRRIGATION CONTROL

CROSS REFERENCE TO RELATED APPLICATIONS

This application is a continuation of U.S. patent application Ser. No. 14/970,349, filed on Dec. 15, 2015, entitled Methods And Systems For Irrigation Control, now U.S. Pat. No. 10,362,739, which is a continuation of U.S. patent application Ser. No. 14/466,469, filed on Aug. 22, 2014, entitled Methods And Systems For Irrigation Control, now U.S. Pat. No. 9,241,451, which is a continuation of U.S. patent application Ser. No. 13/844,248, filed on Mar. 15, 2013, entitled Methods And Systems For Irrigation Control, now U.S. Pat. No. 8,849,461, which is a continuation-in-part of U.S. patent application Ser. No. 12/849,488, filed on Aug. 3, 2010, entitled Methods And Systems For Irrigation Control, now U.S. Pat. No. 8,649,907, which is a continuation-in-part of U.S. patent application Ser. No. 12/537,772, filed on Aug. 7, 2009, entitled Method And System For Remote Wireless Monitoring And Control Of Climate In Greenhouses, which has been abandoned, and which claims priority to Turkish Patent Application No. 2008/05998, filed on Aug. 12, 2008, entitled REMOTE WIRELESS CLIMATE MONITORING AND CONTROL SYSTEM FOR GREENHOUSES, and to Turkish Patent Application No. 2009/00883, filed on Feb. 5, 2009, entitled, REMOTE WIRELESS CLIMATE MONITORING AND CONTROL SYSTEM FOR GREENHOUSES, all of which are hereby incorporated by reference.

BACKGROUND

The present invention relates generally to methods and systems for monitoring and controlling irrigation and climate conditions in landscapes (such as, e.g., municipal parks, gardens, and sports fields) and agricultural environments (such as, e.g., open agricultural fields, greenhouses, and other sites growing crops).

Irrigation systems supply water to soil. They are primarily used to assist in the growing of agricultural crops and maintenance of landscapes. Irrigation systems typically include valves, controllers, pipes, and emitters such as sprinklers or drip tapes. Irrigation systems can be divided into zones because there is usually not enough pressure and available flow to run sprinklers or other water emitting components (e.g. drip tapes) for an entire yard, sports field, or other irrigation site at once. Each zone has a solenoid valve that is controlled via a typically wired connection by an irrigation controller. The irrigation controller is either a mechanical or electrical device that signals a zone to turn on at a specific time and keeps it on for a specified amount of time or until it gets turned off manually.

Branch pipes in each zone are fed by a main line or common supply pipe. Valves are either controlled manually by a person or electronically by a solenoid that is connected to a controller. In existing systems, controllers are typically wired to the solenoid valves and the energy/power to actuate them is provided through wires. Controllers can decide to turn on/off valves based on schedules, weather information, and/or sensor readings. Water can be pumped into the main line from a well source or a city supply.

A "smart controller" is a controller that is capable of adjusting the watering time by itself in response to current environmental conditions. Smart controllers determine current conditions using historic weather data for the local area, soil moisture sensors (water potential or water content), weather stations, or a combination of these.

Weather based smart controllers for irrigation can provide the appropriate watering schedule, adjust for weather changes, and irrigate based on the needs of the field and/or landscape. A smart controller will automatically reduce the watering times or frequency as the weather gets cooler and less water is needed. Then, as the weather begins to warm up, the controller will add more watering time or increase the watering frequency.

Evapotranspiration (ET) is the rate of water loss from the field or other irrigation site. It is nature's process for transferring moisture to the atmosphere by the evaporation of water from the soil and transpiration of water from plant surfaces. ET measurements can be used for determining crop irrigation needs.

BRIEF SUMMARY

A wireless system is provided in accordance with one or more embodiments for monitoring environmental, soil, or climate conditions and/or controlling irrigation or climate control systems at an agricultural or landscape site. In some embodiments, the wireless system includes at least one control and/or sensor node or other control and/or sensor device, controller or element a wireless sensor network including a plurality of sensor nodes for monitoring environmental, soil, or climate conditions and controlling one or more irrigation or climate control systems at the site. In some embodiments, the wireless system includes a wireless sensor network including a plurality of nodes that monitor the environmental, soil, or climate conditions and/or control one or more irrigation or climate control systems at the site. The wireless system also includes a server computer system located remotely from the site. The server computer system is coupled to the wireless network over a communications network for receiving data from and controlling operation of the node/s. The server computer system is also coupled to a device operated by an end-user over a communications network for transmitting the data to and receiving remote control commands or queries from the end-user. Users can remotely access and/or control irrigation or climate control systems at one or more agricultural or landscape sites for which the users have authorization or access to do so.

A method is provided in accordance with one or more embodiments of controlling irrigation or climate control systems at an agricultural or landscape site. The method includes communicating with a wireless network installed at the site over a communications network. The wireless network comprises at least one node for monitoring environmental, soil, or climate conditions and controlling one or more irrigation or climate control systems at the site. Communicating with the wireless network comprises receiving data from and controlling operation of the at least one node. The method further includes communicating with a device operated by an end-user over a communications network for transmitting the data to and receiving remote control commands or queries from the end-user.

In one embodiment, a system for controlling irrigation control systems at a plurality of agricultural or landscape sites, comprises: at least one wireless node at each of the plurality of sites; and a server computer system located remotely from the plurality of sites, said server computer system communicationally coupled to each of the at least one wireless node over a communications network for receiving data from and controlling operation of the at least one wireless node at each of the plurality of sites, said server computer system also selectively coupled to a plurality of devices each operated by one of a plurality of end-users over a communications network for transmitting the data to and receiving remote control commands or queries from the plurality of end-users; wherein the data transmitted to a given end-user corresponds to the site for which the given end-user has authorization; at least one gateway, at a location of each of the plurality of sites, for transferring the data between the at least one wireless node and the server computer system; wherein the server computer system transfers an irrigation schedule to the at least one wireless node of each of the plurality of sites for storage and execution at each of the plurality of sites; wherein the at least one wireless node at each of the plurality of sites is configured to compare received sensor measurements against at least one user-entered control condition, and control the irrigation accordingly, wherein the at least one user-entered control condition is defined at the server computer system by the end-user using a respective device and is transferred from the server computer system to the at least one wireless node and stored in an internal memory of the at least one wireless node.

In another embodiment, a method of controlling irrigation control systems at a plurality of agricultural or landscape sites, comprises: communicating, using a server computer system, with at least one wireless node installed at each of the plurality of sites over a communications network, said at least one wireless node configured to control one or more irrigation control systems at the site, wherein communicating with the at least wireless node comprises receiving data from and controlling operation of the at least one wireless node using at least one gateway, at a location of each of the plurality of sites, the at least one gateway for transferring the data between the at least one wireless node and the server computer system; transferring an irrigation schedule to at least one wireless node of each of the plurality of sites for storage at and execution at each of the plurality of sites; communicating with a plurality of devices, each device operated by one of a plurality of end-users over a communications network for transmitting the data to and receiving remote control commands or queries from the plurality of end-users, wherein the data transmitted to a given end-user corresponds to the site for which the given end-user has authorization; and comparing, by at least one wireless node at each of the plurality of sites, received sensor measurements against at least one user-entered control condition, and controlling the one or more irrigation control systems accordingly, wherein the at least one user-entered control condition is defined at the server computer system by the end-user using a respective device and is transferred from the server computer system to the at least one wireless node.

In a further embodiment, a method of irrigation control comprises: determining a new irrigation schedule or a schedule adjustment to an existing irrigation schedule based at least on weather data; and providing the new irrigation schedule or the schedule adjustment to a user as a recommendation for change rather than automatically implementing the new irrigation schedule or the schedule adjustment.

Various embodiments are provided in the following detailed description. As will be realized, the invention is capable of other and different embodiments, and its several details may be capable of modifications in various respects, all without departing from the invention. Accordingly, the drawings and description are to be regarded as illustrative in nature and not in a restrictive or limiting sense, with the scope of the application being indicated in the claims.

DETAILED DESCRIPTION

Figure 1:
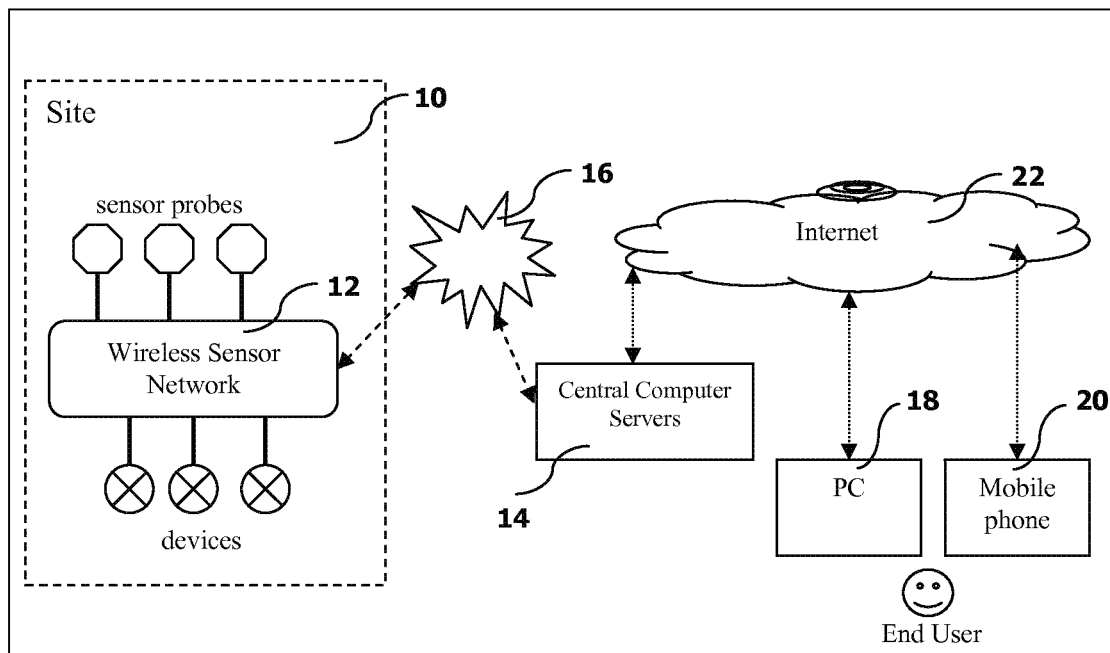
FIG. 1 is a schematic diagram illustrating a remote wireless monitoring and control system in accordance with one or more embodiments of the invention.

In accordance with one or more embodiments, a wireless monitoring and/or control system is provided for irrigation and climate management for landscapes and agricultural environments. In some embodiments, the system includes one or more devices or nodes at each site for monitoring environmental, soil, or climate conditions and/or for controlling one or more irrigation or climate control systems at the site. In some embodiments the system includes a wireless sensor network comprising a plurality of sensor and/or control nodes for monitoring environmental, climate, and soil conditions and/or controlling one or more climate control systems and/or irrigation valves and pumps. The system also includes a server computer system located remotely from the irrigation site. The server computer system is coupled to the wireless network over a communications network for receiving data from and controlling operation of at least one node. The server computer system is also coupled to a device such as a cell phone or a personal computer operated by an end-user over a communications network for transmitting the data to and receiving remote control commands or queries from the end-user via a user interface provided to the user at the device. A user interface may be provided by the server (e.g., through transmitted HTML), or may be provided by dedicated software installed and executed on the end-user device.

An irrigation control system in accordance with one or more embodiments can include one or more of the following components:
a. Field hardware
   i. Sensors such as soil moisture probes, water flow meters, water pressure gauges, and ambient temperature and humidity probes
   ii. Devices such as water valves and pump motor control relays
   iii. Wireless sensor nodes that make up the wireless sensor network
   iv. Wireless special function nodes such as meteorology station nodes and well control node
   v. Wireless gateway that connects field equipment to a computer server
   vi. Wireless control nodes that include functionality to respond to remote controls and/or store and execute a partial or full irrigation schedule
   vii. Nodes with combinations of one or more of the above functions
b. Wireless sensor network firmware that runs on nodes
c. Computer server located remotely from the irrigation/climate control site
d. Application running on an end-user device (e.g., a cell phone, tablet or computer application) for communicating with the computer server
e. Web-based application running on the computer server for user interaction and data access It is understood that this is not intended to be an exhaustive listing of all possible hardware and/or firmware, software, etc., as such will be implementation dependent.

In accordance with one or more embodiments of the invention, a method of monitoring and/or controlling irrigation and/or climate conditions in landscapes and agricultural environments is provided. In some embodiments, the method includes communicating with a wireless network installed in the irrigation/climate control site over a communications network. The wireless network comprises at least one sensor node and/or at least one control node and/or at least one sensor and control node for monitoring environmental, climate and soil conditions in the site and/or controlling one or more climate and/or irrigation control systems such as solenoid valves and pumps. It is understood that as used throughout this specification, a sensor node may not necessarily be a sensor only node, i.e., a sensor node may include some control functionality, and thus, at least in part be considered a sensor node and a control node. Communicating with the wireless network comprises receiving data from and controlling operation of the nodes. The method also includes a step of communicating with a device such as a cell phone or a personal computer operated by an end-user over a communications network for transmitting the data to and receiving remote control commands or queries from the end-user.

Figure 7:
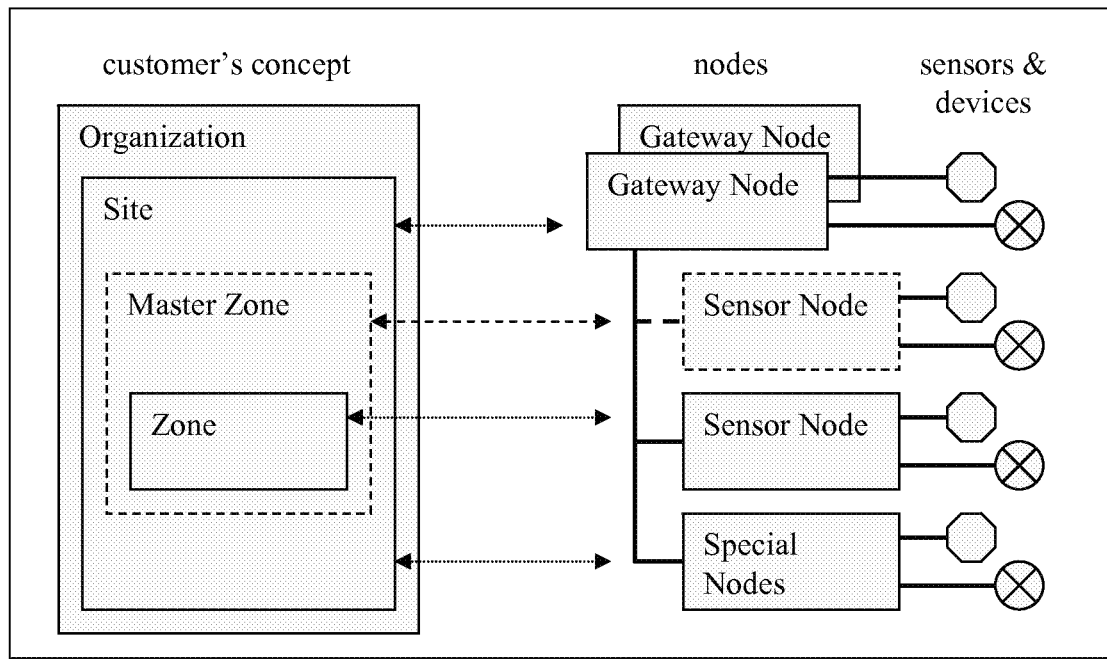
FIG. 7 is a block diagram of a system hierarchy of an exemplary irrigation system illustrating the relationship within and between the organizational structure and field equipment in accordance with one or more embodiments of the invention.

The organizational hierarchy of an irrigation system in accordance with one or more embodiments can have multiple levels. For example it can be four levels deep as shown in the exemplary system of FIG. 7. In smaller sites, partitioning to master zones may not be required. A site may be handled by one or more gateway nodes. A zone is handled by one or more sensor nodes. If there is a need to connect sensors or devices to a master zone, such as a master zone water valve, then a sensor node is used for this master zone. Special nodes, such as a meteorology station, can serve all nodes of the whole site. Sensors and devices are generally connected to the sensor nodes. However, if needed, additional sensors and devices may also be connected to the gateway node if required.

To compute the irrigation requirements for plants at a given irrigation site (e.g., field or landscape), daily ET data gathered from onsite wireless sensor nodes and/or from a weather station at or close to the site can be used in combination with information entered by end-users into the website about crops and other plants. Using these inputs, the system can compute an accurate watering schedule for each zone at the irrigation site and adjust or update each zone's schedule as needed on a daily basis. The wireless sensor nodes controlling the irrigation valves can get the updated schedule from the server.

The system compares the ET measurements with the soil moisture readings (e.g., water volumetric content or water potential) taken from wireless sensor nodes. If the difference is greater than a given threshold value defined by the end user, the system adjusts the schedule based on soil moisture probe readings.

In addition, the system can collect actual irrigation information through flow meters or sensors attached to wireless sensor nodes. In this way, the system can compare what is scheduled versus what was actually applied. There may be a difference if the valves are controlled manually and/or if there are problems or leaks in the irrigation system (e.g., in the pipes, valves etc.). Based on the actual irrigation amounts, the system can adjust the irrigation schedule going forward, e.g., for the following 7 days.

In accordance with one or more embodiments, the system integrates public weather forecast information. The server checks for the rain forecast and decides whether or not to delay an upcoming irrigation event based on the amount of expected rain, the likelihood of rain event, and calculated and/or measured plant needs.

The system in accordance with one or more embodiments offers an on-demand irrigation capability. Soil moisture as well as ET calculations may be used to schedule irrigation. Those calculations may be used to determine a schedule. A system that solely depends on soil moisture readings and controls irrigation based on two thresholds to start and stop at would be considered an on-demand irrigation.

When on-demand irrigation is followed, irrigation control decisions are made by nodes intelligently, and not by the server. In this way, latency in receiving commands from server is eliminated (except when user sends manual commands). In addition, there is no need for delegated irrigation programs running on the server because the schedule and/or control condition is always on the node and the node decides based on this information.

When an on-demand irrigation technique is used, the server is used as a means of interfacing with the network and manages two way data communication. Rules/conditions are stored on devices for execution and server for redundancy.

In accordance with one or more embodiments of the invention, operation of any valve in the system may be overridden by a manual command. Independent of the state of the valve according to the current scheduled irrigation program, it may be forced to turn on or turn off. A valve will stay in this manual override position irrespective of the status that is demanded by the irrigation program for that time of day. A manually issued "resume" command will return control of that valve back to the irrigation program where the valve will be set to the position as scheduled there.

In accordance with one or more embodiments, if a manual command is sent to node to turn a valve on or off, the node sends an acknowledgment to the server about execution and stores the unique ID associated with the control command. If the server does not receive the acknowledgement, it will retry to send the command with the same unique ID. When the node receives it the second time, it will not execute the command but re-acknowledge prior execution of the command to the server.

In one or more embodiments, an emergency override command is available to turn off all the valves in the system. This command may be issued during emergency conditions such as, e.g., an earthquake. After an emergency stop, individual valves may be manually turned on or off or resumed at will. An emergency resume command is also available where control of all valves are returned back to the current irrigation program.

In accordance with one or more embodiments, the server performs periodic health checks to see if all nodes are available and alerts users or tries to overcome the problem (such as soft reboot on root/node etc.).

A wireless climate monitoring and control system in accordance with one or more embodiments provides significantly improved scalability and reliability because information is transferred from sensor node to node and then to a remote central server computer system, and the wireless sensor network can reconfigure itself dynamically.

Furthermore, in a system in accordance with one or more embodiments, wireless sensor networks are used to collect climate and soil data and to control the irrigation. This system offers numerous advantages including wireless installation, flexibility, and scalability. Since additional sensor units can be easily and cost effectively implemented, it is possible to provide a large number of sensor nodes at a site. Having a greater number of sensor nodes helps provide a better understanding of micro-climates as well as soil moisture status, which can vary significantly in a field due to natural variability in the soil. The system in some embodiments accordingly provides improved accuracy on measurements, making micro-climate management possible. Due to micro-climatization, growth of small plant groups can be monitored and surrounding conditions can be adjusted accordingly.

In addition, multiple irrigation zones can be irrigated independently based on the sensor readings in the respective zone. Typically, as there may not be enough pressure on the main line, separate irrigation zones will not be irrigated at the same time. The system in accordance with one or more embodiments can perform scheduling of irrigation between zones for optimal irrigation efficiency. The scheduling can be based on a variety of considerations including, e.g., available water pressure and constraints defined by the end user including, e.g., zone prioritization based on crop importance.

A remote wireless monitoring and control system for irrigation in accordance with one or more embodiments includes a distributed control capability. Rather than one central controller or a server managing the irrigation control, distributed wireless sensor and/or control nodes run software that can execute the control decisions based on predetermined rules or schedule.

In a wireless climate and soil monitoring and control system in accordance with one or more embodiments of the invention, climate parameters (temperature, light, humidity, soil moisture, and leaf wetness etc.) measured by the sensors are stored in a server computer at a remote central location. Management and data storage on a central server as described herein reduces costs for the end users and makes the installation and remote management of the climate monitoring and control system easier. Remote control commands or control condition set values sent through the central server (from a cell phone or any computer on the Internet) are transmitted to wireless sensor nodes in the greenhouse or field, allowing manual and/or automatic control functionality.

In a system in accordance with one or more embodiments, data is transmitted from the sensor network to the main server computer through cellular or satellite networks or using broadband communication technology. In this manner, data coming from multiple sensor networks (sites) is consolidated and stored in a central computer server and then monitored/managed remotely through web, cell phone, or text message (SMS) applications.

A system in accordance with one or more embodiments allows monitoring climate conditions (temperature, humidity, light etc.) and controlling climate control systems inside the network by sensor nodes. In addition, it addresses how data collected by multiple sensor networks are stored in a central server and how control commands passing through this server are processed to manage the climate.

In a system in accordance with one or more embodiments, data is transferred from sensor networks to the central server through a cellular network or a wireless broadband communications technology. Data coming from a plurality of sites (local sensor networks) are consolidated and stored in the central computer server. Climate measurements taken are provided to the end users through web, cell phone, and/or text message (SMS, MMS, etc.) applications. Moreover, the system enables remote control commands to be sent to the irrigation site.

In one or more embodiments, climate parameters (temperature, humidity, light, soil moisture and leaf wetness etc.) can be continuously monitored and, for undesired values, automatic preventive actions can be taken before the products are harmed. For example, when flow sensors detect leakage excessive water on a pipeline, actuators can trigger the pump to shut down or main line solenoid valves to cut the water supply. Also, for any readings beyond pre-defined thresholds, the end user can be notified, e.g., by a short message (SMS, MMS, etc.) to his or her cell phone or via e-mail.

In accordance with one or more further embodiments, the computer server analyzes soil condition data received from the wireless sensor network and generates recommended upper and lower threshold values for starting and stopping irrigation. The computer server can recognize trends in soil moisture graphs or from moisture data and alert the user if conditions are unsatisfactory (e.g., if the area is over or under irrigated or if the soil moisture level is saturated) or if the roots are active and healthily pulling water from the soil. The user has the option of accepting or modifying the recommended values generated by the computer server.

Systems in accordance with one or more embodiments can be easily installed in open fields, landscapes, and greenhouses due to use of wireless and battery powered components. This reduces wiring costs and pollution. At the same time, since no computer system is installed within the site, the total system cost is reduced and maintenance is made easier.

An irrigation system in accordance with one or more embodiments provides a controlled irrigation and production environment that increases productivity in agricultural environments, reduces losses occurring because of frost and various diseases, and improves quality. One element of building such an environment is an automation system. Using automation systems, the climate within a greenhouse can be kept at generally ideal conditions for the plants, and irrigation within the greenhouse or open fields can be optimized based on crop needs thereby achieving generally maximum production performance. Systems in accordance with one or more embodiments of the invention make agricultural automation and irrigation control affordable, easy to use, and provide flexibility of use.

In accordance with one or more embodiments, nodes of the wireless sensor network can operate in sleep mode to reduce battery consumption. Sensor nodes wake up at certain time periods and listen to the signals to see if there is any data sent to them. If there is a signal with data addressed to them, they process the data or forward it to another node and then go to a sleep mode again by turning off their RF transmitter and receiver. Likewise, in certain periods, the sensor nodes take measurements and send it to either the main gateway (base station) or to the neighbor node with best data link quality. They then go back to a sleep mode after the transmission. A multi-hop structure (mesh networking) used in the sensor network increases the energy efficiency by keeping the RF signal power at lower levels. In addition to increasing energy efficiency by sending the data through other nodes across short distances, sensor nodes can easily extend the total coverage area with this structure.

With a mesh network structure in accordance with one or more embodiments, every node shares the information it has with all other nodes. This way, nodes can synchronize critical data among each other and can run control commands based on collaborative data.

Remote wireless climate, environmental, and soil monitoring and control systems in accordance with various embodiments thus provide a number of advantages. The systems provide improved scalability and reliability. The systems can allow usage of significantly larger number of sensor units. The systems can achieve high accuracy and micro-climatization, and address data reliability concerns due to soil variation. The systems can allow monitoring multiple irrigation zones and small plant groups and controlling the environment and irrigation accordingly. The systems can allow remote management of climate and soil monitoring and control system through Internet, cellular phone and/or SMS or MMS applications. The systems can reduce system and management costs for the end user. The systems can consolidate and store measurements coming from multiple sensor networks (at respective sites) on a central computer server. The systems can sense climate, environmental, and soil conditions (temperature, humidity, soil moisture etc.) and to control climate or irrigation systems in the network with the sensor nodes. The systems can enable wireless communication, monitoring, and management from far distances. The systems can enable the usage of a multi-hop dynamic network or mesh network structure. The systems can enable remote monitoring and control of wireless sensor networks in landscapes, open fields and greenhouses via a central computer server. The systems can reduce cable pollution and installation difficulties. The systems can provide capabilities to automatically prevent or reduce damages to plants from undesired climate values (temperature, humidity, light etc.) or irrigation inefficiencies. The systems can increase productivity in agricultural environments. The systems can prevent or reduce losses due to frost and various diseases. The systems can create a controlled production environment in order to increase product quality. The systems can achieve significantly improved production performance.

Figure 2:
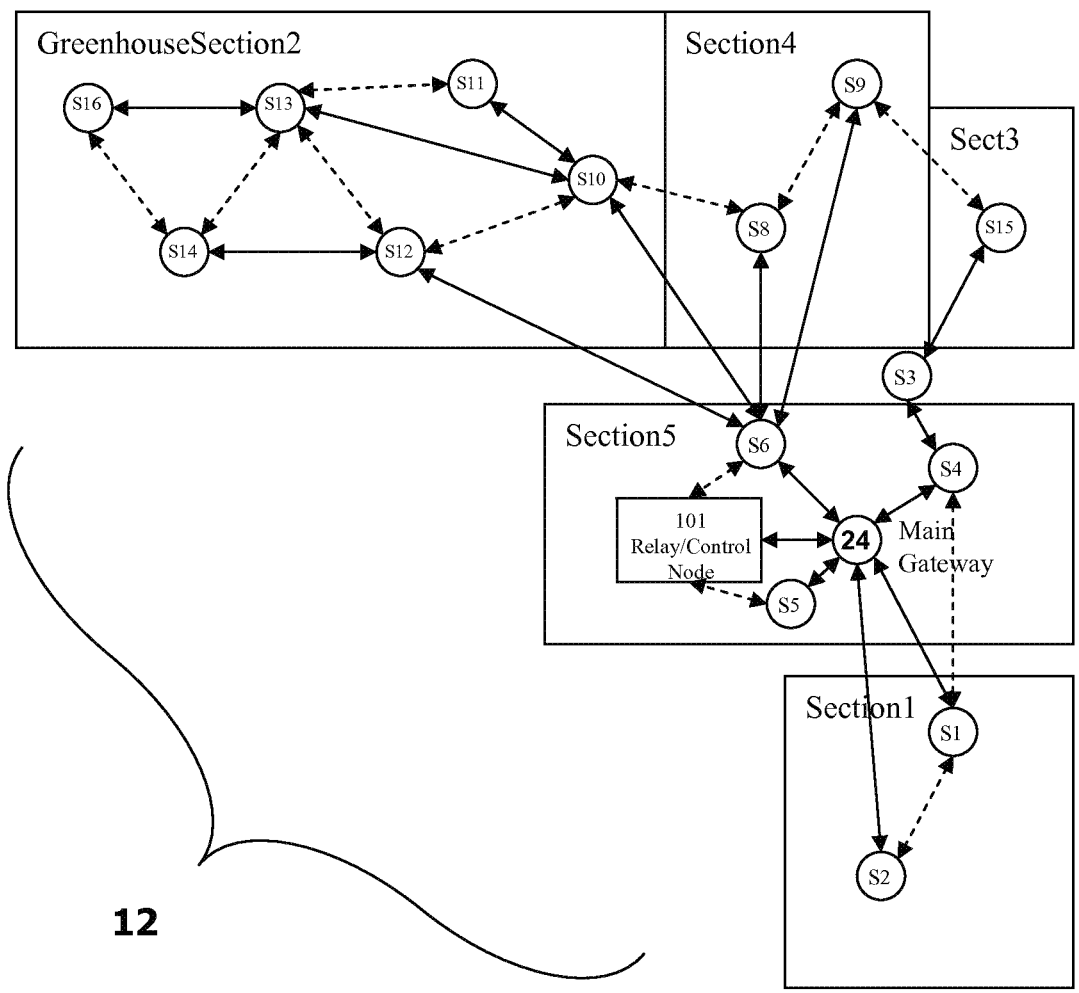
FIG. 2 is a schematic diagram illustrating a wireless sensor network in accordance with one or more embodiments of the invention.

FIG. 1 illustrates an exemplary architecture of a wireless climate monitoring and control system for an irrigation/climate control site (e.g., greenhouse, open field, or landscape) 10 in accordance with one or more embodiments of the invention. The system includes a wireless sensor network 12 having a plurality of sensor and/or control nodes installed in the site 10. FIG. 2 schematically illustrates an exemplary wireless sensor network 12 in greater detail. The sensor network 12 includes sensor nodes S1-S16, which form an ad-hoc (i.e., dynamic) wireless sensor network and monitor climate, environmental, and soil conditions and collect measurements. The sensor nodes S1-S16 send these measurements to a central computer server 14 through a communications network 16 such as a cellular network (e.g., GPRS, Edge, UMTS etc.) or a wireless wideband network (e.g., WiMAX).

The central computer server 14 receives measurements and other data from a plurality of sites. The measurements/data collected from member sites are stored in a database on the central server 14. End users can access collected data over a web page on a device such as a personal computer 18 over the Internet 22 or through a cell phone application 20. The end users can use the same applications to send commands to the sensor nodes S1-S16 to trigger actuators for irrigation and/or climate control systems (e.g., heating, ventilation, misting units etc.) and provide manual and/or automatic remote control capability.

The sensor nodes S1-S16 installed in the site 10 support multiple sensor probes for measurements. These sensor probes include, but not limited to, ambient temperature and humidity, soil moisture, temperature and EC, solar radiation, leaf wetness, wind and rain.

The sensor nodes S1-S16 installed in the site 10 transfer the data they collect to a main gateway/base communication node 24 by relaying the data through other sensor nodes S1-S16 known as neighbor nodes. The sensor nodes S1-S16 identify their neighbor nodes based on signal quality. In particular, the sensor nodes S1-S16 identify nodes that provide the best quality data transfer link and transfer data through the neighbor with which the best quality data transfer link can be established. The neighbor node, which is used as a bridge, is called parent node. For example, as shown in FIG. 2, any node that receives data from another node is a parent node. For example, node S13 is the parent of node S16, and node S10 is the parent of node S13.

If there is a communication problem between a sensor node and its parent, the sensor node starts to use one of its other neighbors as its parent node. In this way, the sensor network 12 reconfigures or heals itself dynamically. Hence sensor nodes S1-S16 can easily be relocated to different spots in the site.

End users can operate devices such as a cell phone 20 having a cell phone application or short text message communication application or a personal computer 18 having a web application to facilitate communication with the central server 14 and retrieve information from the central site information and measurement database.

The wireless sensor network 12 includes a plurality of sensor nodes S1-S16, which have sensing (e.g., temperature, solar radiation, humidity, soil moisture, electrical conductivity etc.), processing and communication capabilities and can be battery operated and solar powered. The network 12 is generally used to monitor the environment and interact with the physical world.

The wireless sensor network 12 also includes a main gateway/base communication (root/sink) node 24, which is the main communication device where all data is collected and from which the data is transferred to the central computer server 14.

The central server or main computer 14 collects data from all member sensor networks. The central computer also distributes various data to member sensor networks. A software program that collects and processes data through Internet protocols such as TCP or UDP, and a database runs on this computer.

The climate, environmental, and the soil conditions in the site are monitored and controlled by using wireless sensor and control nodes S1-S16. Sensor nodes S1-S16 form an ad-hoc (dynamic) network as soon as they are installed in the site. Sensor nodes share collected sensor information (temperature, humidity, light, soil moisture, EC, PH, and $CO_2$ etc.) with each other and transmit to main gateway 24.

Communication between the wireless sensor network 12 in the site and the central server 14 is established by using, e.g., GPRS, Edge, 3G, UMTS or similar technologies over cellular network 16 or a wireless broadband data communication service such as WiMAX. Main gateway device 24 includes hardware for communicating with the wireless sensor network 12 at the site and the cellular network 16.

Data coming over the cellular network 16 is collected and transferred to central server 14 using the Internet 22 by using Internet protocols such as, e.g., TCP and/or UDP by the cell phone operator.

The central main server 14 is the central computer system where measurement data from various sites is collected and served to end users through the Internet 22 or by cell phone 20. At the same time, end users initially transfer the queries they will be sending to sites or system parameters like control conditions to the main server 14. Main computer server 14 transfers this information to the network in the site through channels as described below in FIGS. 3 and 4.

The system provides network management and monitoring capability through cell phones 20. End users can query the sensor readings inside the network by sending short text messages (SMS) or by using a client application installed on their cell phone 20. At the same time, end users can activate various climate control systems such as heating, ventilation, or misting through their cell phones 20 and ask for text message alerts to be delivered to their cell phones 20.

The system also provides network management and monitoring capability through a web enabled device 18. Data collected on sensor networks 12 is stored in a central database. Using a web application, this data is processed and served to the customer. At the same time, commands can be sent to nodes S1-S16 in the network 12 through this web application 18. Access to web application 18 is preferably restricted to end users or other users who are authorized by the owner.

One or more embodiments of the invention are directed to setting up a wireless sensor network 12 in the site and sensor node features and placement techniques.

Wireless sensor nodes S1-S16 can be placed some distance apart, e.g., with a distance of 30 m to 2000 m between each other. Depending on the structure of the greenhouse or the open field terrain, the construction type/material or the type of the product produced and other obstructions, this distance can be shorter or longer. If nodes see each other, this helps them to get better quality signals. Placement of sensor nodes in the site can be adjusted by looking at the signal link quality between nodes and parent information for each node by using the web application 18. If there is no sensor measurement flow from one node to the other, this may indicate that the nodes are not within each others coverage areas. When this is the case, the node outside coverage area of the other should be moved closer. Sensor nodes can easily be fixed to poles using, e.g., cable ties, U-bolts or clamps.

Wireless sensor nodes with integrated dry contacts (relays) can be tied to solenoid valves and climate control systems operating with electricity such as vents, fans, heating, heat curtains, shade curtains, misting, cooling pads, or alarm bell to provide control capability.

A remote wireless climate and soil monitoring and control system developed in accordance with various embodiments of the invention can have one or more of five main process flows: (a) data collection and alarm message transfer process, (b) data query process, (c) control condition dissemination and control mechanism execution process, (d) irrigation scheduling and optimization process, and (e) irrigation schedule dissemination and execution process. Detailed explanations for these processes are provided below with respect to the flow diagrams of FIGS. 3, 4, 5, 6, 8, 9, and 10. It is understood that additional process flows may be provided in other embodiments.

Figure 3:
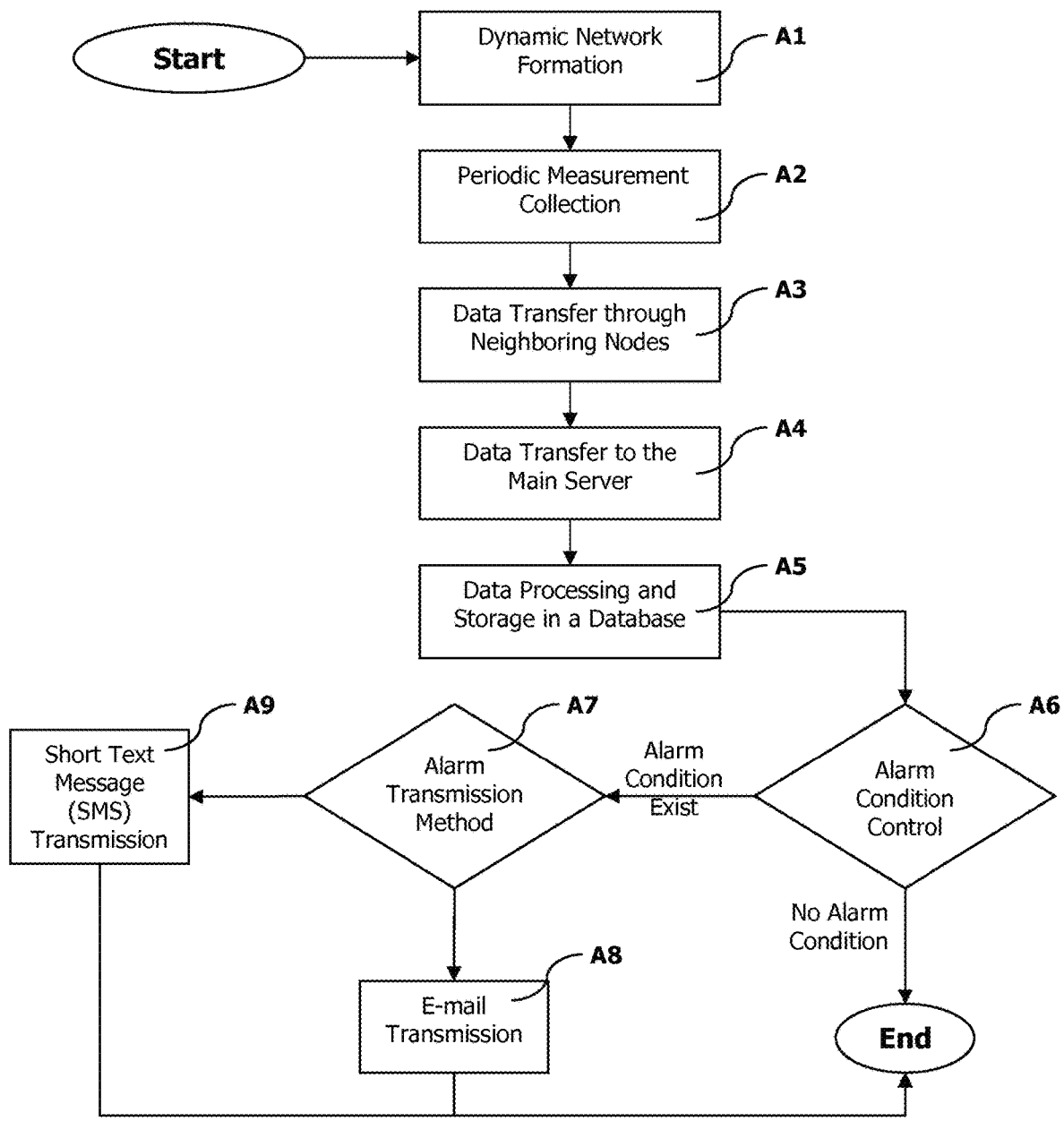
FIG. 3 is a flowchart illustrating a data collection and alarm message transfer process flow in accordance with one or more embodiments of the invention.

FIG. 3 illustrates the data collection and alarm message transfer process flow. Wireless sensor nodes S1-S16 are preferably programmed before they are installed at the irrigation site. During the programming, each sensor node takes a unique serial id and each site/network is assigned a unique code. The same sensor nodes S1-S16 are also addressed with a number for easy recognition at the site. The serial numbers used are unique and all sensor nodes S1-S16 have different numbers from each other. However, addresses need only be unique within the wireless sensor network 12 for a particular site. For example, a sensor node with address "1" can exist in more than one wireless sensor network 12 (or site). In this way, during dissemination data can be sent to the right address, and during collection the source address of the incoming data can easily be identified.

After installation at the irrigation site, the sensor nodes S1-S16 discover the closest and most reliable path to the base communication node (root) 24 and form an ad-hoc (dynamic) network as shown in step (A1). Those nodes that do not have a direct communication link to the base node 24 discover routes to transfer data through other neighboring nodes. During route selection, signal quality and the number of nodes in the route are considered. Sensor nodes S1-S16 periodically (at predefined intervals) measure soil and environmental climate conditions such as soil moisture, temperature, humidity, and light as shown in step (A2). Sensor nodes S1-S16 that take measurements transfer their data to the base node 24 according to the route they discovered in step A1 at step (A3). Base communication node 24 transfers the data it collects from the network to the main server 14 through cellular network or wideband wireless network 16 at step (A4). Data transferred from base communication node 24 to the cellular connectivity terminal is stored in buffer memory to protect losses against communication failures or shortages. The main server 14 processes all the data coming from sensor networks 12 and stores them in the database at step (A5). A software program running on main server 14 compares incoming data to alarm conditions at step (A6). If an alarm situation exists, depending on the transfer medium determined at step (A7), either an e-mail at step (A8) or a short text message (SMS) at step (A9) is sent to the end user.

Figure 4:
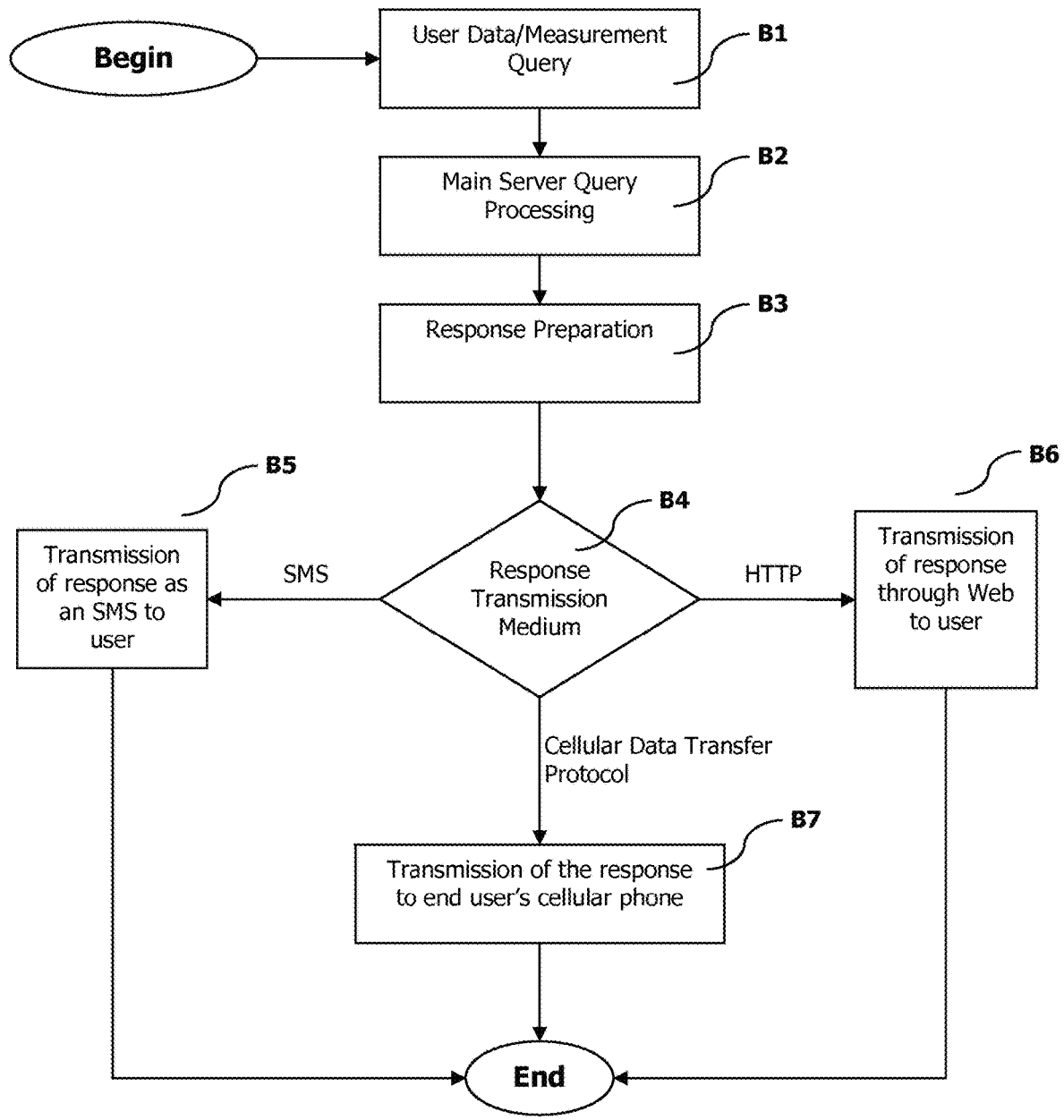
FIG. 4 is a flowchart illustrating a data query process in accordance with one or more embodiments of the invention.

FIG. 4 illustrates the data query process flow in accordance with one or more embodiments of the invention. The end user can query the sensor readings from the wireless sensors in the site via cell phone 20 or Web device 18 at step (B1). For this process, end users can use their cell phones 20 to send short text messages (SMS) or to query via a client application installed on the cell phone 20 or use the web site. After receiving the query, the main server 14 processes it to understand the content at step (B2), and prepares the appropriate answer at step (B3). Depending on the query method or medium, the main server 14 decides with which of the following methods to transfer the answer in step (B4). The main server 14 can send the answer to the end user as a short text message (SMS) at step (B5). Alternately, the main server 14 can send the answer to the end user as a web page at step (B6). The main server 14 can also send the answer to the end user as a screen to be displayed on the cell phone application at step (B7).

Figure 5:
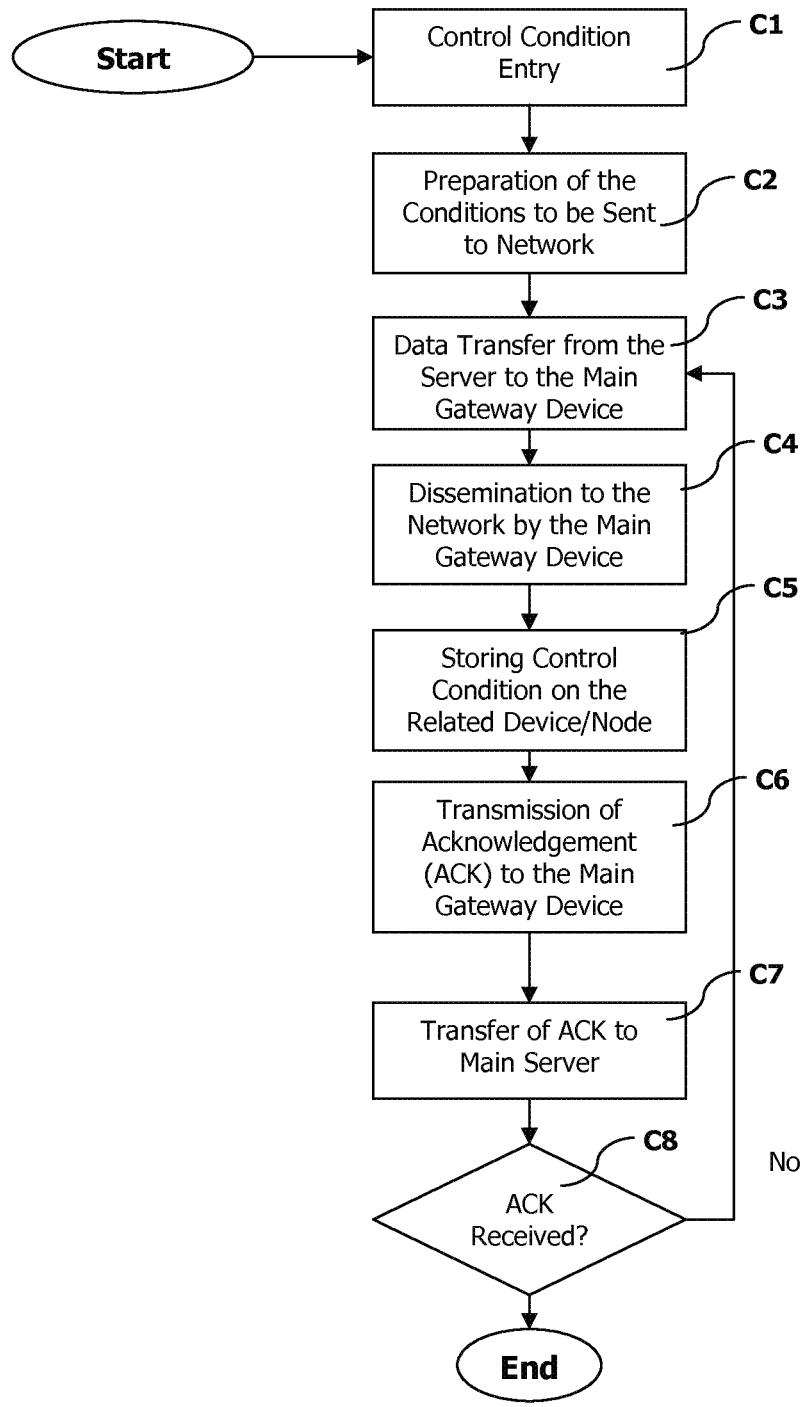
FIG. 5 is a flowchart illustrating a control condition dissemination process in accordance with one or more embodiments of the invention.

FIG. 5 illustrates a control condition dissemination process flow in accordance with one or more embodiments of the invention. By using the dry contact outputs on main gateway device 24 or the sensor nodes S1-S16, climate control systems operated with electricity, e.g., those having motors such as misting, vents, heating, and curtains and solenoid valves can be controlled. For automatic control, various control conditions can be defined in the system. Climate control systems, solenoid valves and/or pumps are activated or deactivated as a result of comparison of control conditions against the measurements taken by the sensors local to the related device or attached to other sensor nodes S1-S16 in the network. Control conditions can be evaluated according to the following parameters:

(K1) Sensor Type (e.g., soil moisture, temperature, humidity, light): Defines against which sensor readings the control conditions will be compared.

(K2) Minimum Condition (Set) Value: Defines below what value the control will be activated (start) (K4b) or deactivated (stop) (K4a).

(K3) Maximum Condition (Set) Value: Defines above what value the control will be activated (start) (K4a) or deactivated (stop) (K4b).

(K4) Start Condition: (a) When the measurement is above the maximum condition value, the control is activated (started). When it falls below the minimum condition value, the control is deactivated (stopped). (b) When the measurement is below the minimum condition value, the control is activated (started). When it goes above the max condition value, the control is deactivated (stopped).

(K5) Work Duration: Dry contact stays active (i.e., on or working) for this duration. If zero (0), it stays active as long as the control condition is set.

(K6) Stall Duration: After working for work duration, dry contact stalls (i.e., off or not working) for stall duration. If zero (0), dry contact only works (i.e., stays active or on) for work duration (K5) and then becomes inactive even if the control condition is set.

(K7) Action Type: Defines what type of action to be taken if the control condition is set. (a) Control dry contact output; (b) Notify another sensor node.

(K8) Dry Contact No: For (K7a) case, defines which dry contact output to be controlled.

(K9) Node Address/Number to Be Notified: For (K7b) case, defines which sensor node to be notified if the control condition is set.

(K10) Synchronization Status: Indicates whether the control system will be controlled in synchronization with events and/or measurements from other sensor nodes.

(K11) Synchronization Number: If synchronization is used (K10), related sensor nodes use the common synchronization number.

(K12) Condition-in-Effect Start Time: Start time for the time interval of the day when the condition will be active.

(K13) Condition-in-Effect End Time: End time for the time interval of the day when the condition will be active.

Based on the parameters described above, the control condition is entered through the web page or cell phone 20 at step (C1) shown in FIG. 5. The main server 14 prepares these parameters to be transferred to the wireless sensor network 12 at step (C2). Prepared data is transferred from main server 14 to the main gateway device 24 through cellular network or wireless wideband network 16 and Internet 22 at step (C3). The main gateway device 24 sends control conditions to the sensor nodes through dissemination at step (C4). If the receiving nodes realize the condition is addressed for themselves, they store the condition in their internal memories and start checking them at step (C5). Related node transfers the acknowledgement (ACK) message to the main server 14 via main gateway device 24 to indicate successful reception at steps (C6, C7). If the main server 14 receives the acknowledgement message, it completes the operation. Otherwise, it assumes that the control condition has not reached to the node and retransmits it to the network 12 at step (C8).

Figure 6:
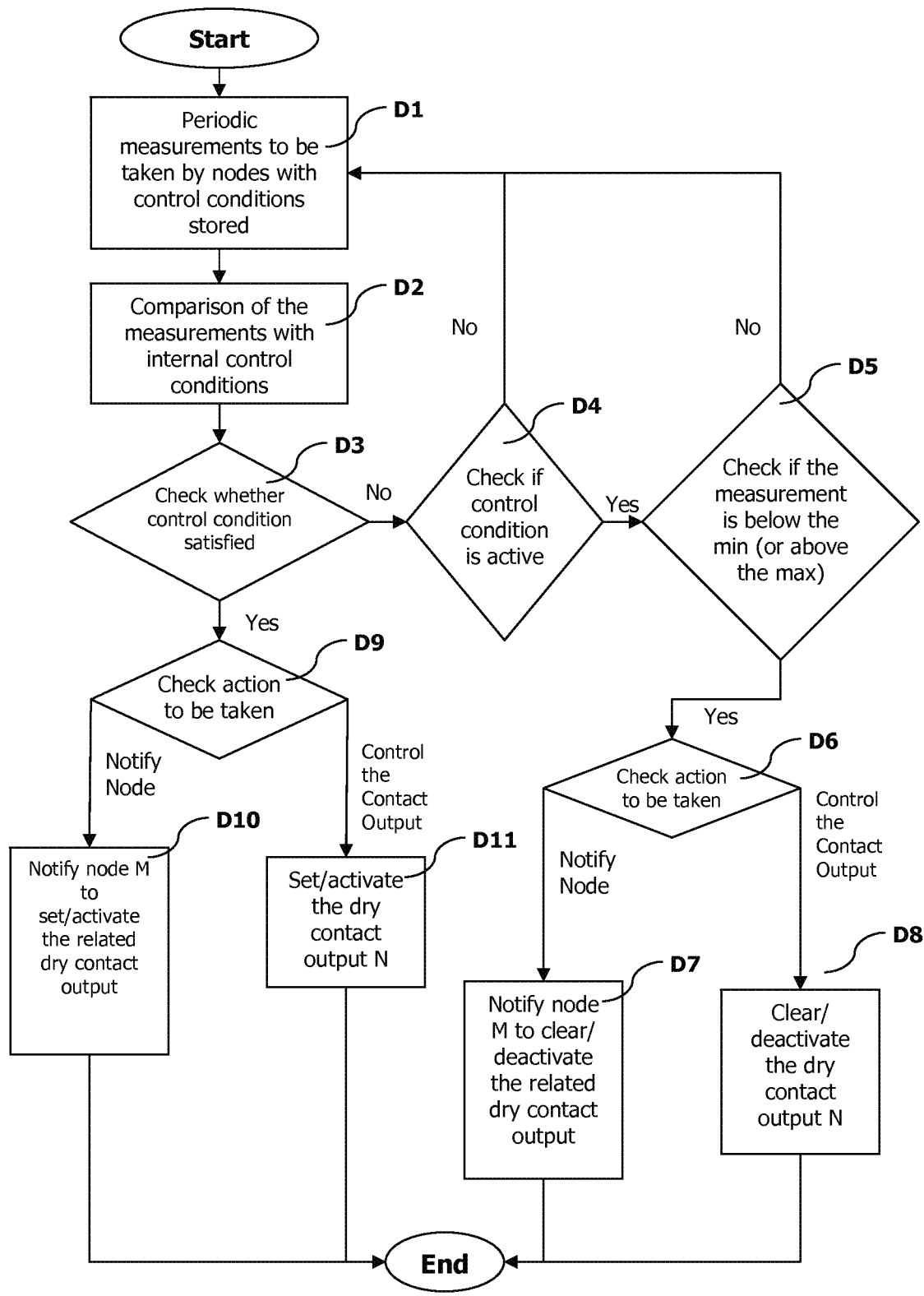
FIG. 6 is a flowchart illustrating a control mechanism execution process in accordance with one or more embodiments of the invention.

FIG. 6 illustrates a control mechanism execution process flow in accordance with one or more embodiments of the invention.

The sensor nodes that store control conditions in their internal memory periodically take measurements to evaluate control conditions at step (D1). If a taken measurement satisfies (sets) control condition at step (D2, D3), the action to be taken is checked at step (D9). At step D3, the time of the day is also compared to the control condition-in-effect time interval (starts at K12 and ends at K13). As a result of the set control condition, if a sensor node is to be notified, a notification is sent to the related node to tell the condition is set at step (D10). If an internal dry contact output of the sensor node is to be controlled, then the related output is activated, and this way the connected control system is started at step (D11). If the control condition is not set in step D3, whether the control condition is active at that moment is checked at step (D4). If active, whether the measurement is below the min condition value or above the max condition value is checked at step (D5). At step (D5), also the time is compared to the condition-in-effect time interval. Even if the condition is not reversed, if the time is past condition-in-effect end time (K13), the flow progresses to step (D6). If (K4a) is entered in the control condition and the measurement is below min condition value or if (K4b) is selected and the measurement is above the maximum condition value, process flow goes to step at step (D6—check action to be taken). Depending on the action to be taken at step (D6), either the sensor node entered in K9 is notified at step (D7) or the dry contact output entered in K8 is deactivated/cleared at step (D8).

Figure 8:
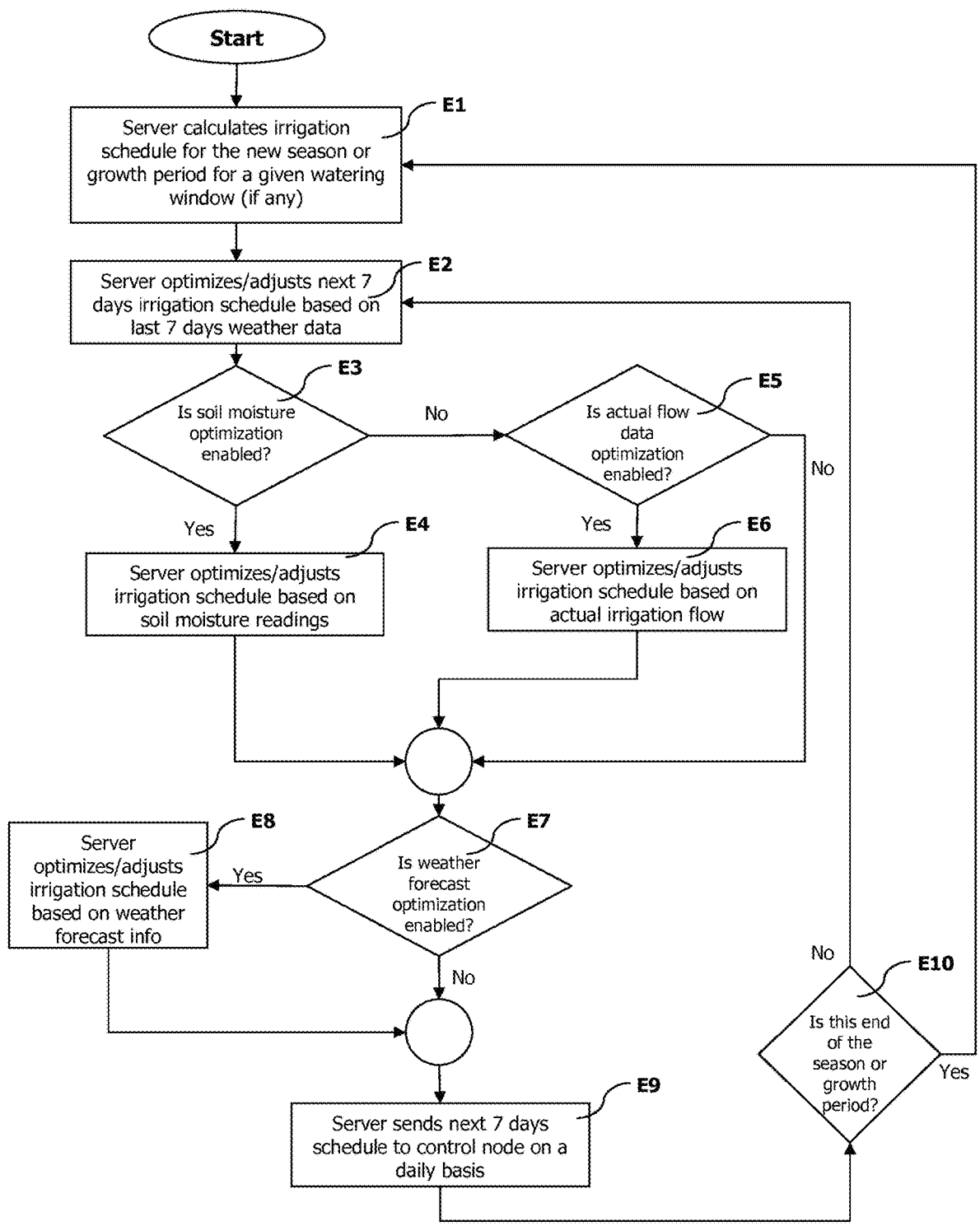
FIG. 8 is a flowchart illustrating an irrigation scheduling and optimization process in accordance with one or more embodiments of the invention.

FIG. 8 illustrates the irrigation scheduling and optimization process flow in accordance with one or more embodiments of the invention.

At step (E1), the server calculates/projects the irrigation schedule for the season or the growth period based on ET values of last year's weather information (historical data—on-site or nearby weather stations) for the site and site specific information such as crop type and soil mixture and the growth period (e.g., blooming, pre-harvesting etc.). For example, the water balance approach can be used for scheduling the irrigation. When the schedule is first created or any time it is adjusted, it is optimized for a given watering window (e.g. water may only be available during certain times of the day and/or certain days of the week). The server optimizes/adjusts the irrigation schedule for a given period of time based on a past period of time at step (E2). In this example, the irrigation schedule is adjusted for the next 7 days based on last 7 days' ET calculations on a daily basis. (This duration could be different time periods, e.g., 3 days or 5 weeks etc.)

Then, server checks if the soil moisture measurement optimization is enabled (E3). If it is enabled (E4), the server optimizes the remaining irrigation schedule based on soil moisture sensor readings. If the difference between actual soil moisture readings and the predicted soil moisture levels based on the ET calculations is greater than a predefined threshold number, the server modifies the schedule to match the actual soil moisture readings.

If the soil moisture optimization is not turned on, the server checks if the actual flow data optimization enabled at step (E5). If it is enabled, the server optimizes the irrigation schedule for the next 7 days based on actual irrigation data on the past 7 day period at step (E6). In this way, any irrigation deficiency is addressed from the previous time period (e.g., 7 days).

At step (E7), server checks if weather forecast optimization is enabled. If it is enabled, at step (E8), the server looks at the public or private weather forecast data and decides if the schedule should be modified (e.g., delayed) for a given rain amount and probability by comparing the thresholds defined by the user. After the scheduling and optimization is complete, the server sends next 7 days' schedule to the control nodes at the site on a daily basis at step (E9). This process goes back to (E1) if the end of season or the growth period is reached (E10) or back to (E2).

In some embodiments, the wireless sensor nodes have the capability to control solenoid valves or pumps, i.e., they may be sensor and control nodes. They can be connected (wired or wirelessly) to battery or electricity operated valves to turn them on and off. In this way, the controlling capability is distributed in the network without wires (no wires for communication and no wires for electricity as the nodes are battery operated). Thus in some embodiments, there is no need for a central controller to control operation of valves and pumps.

Figure 9:
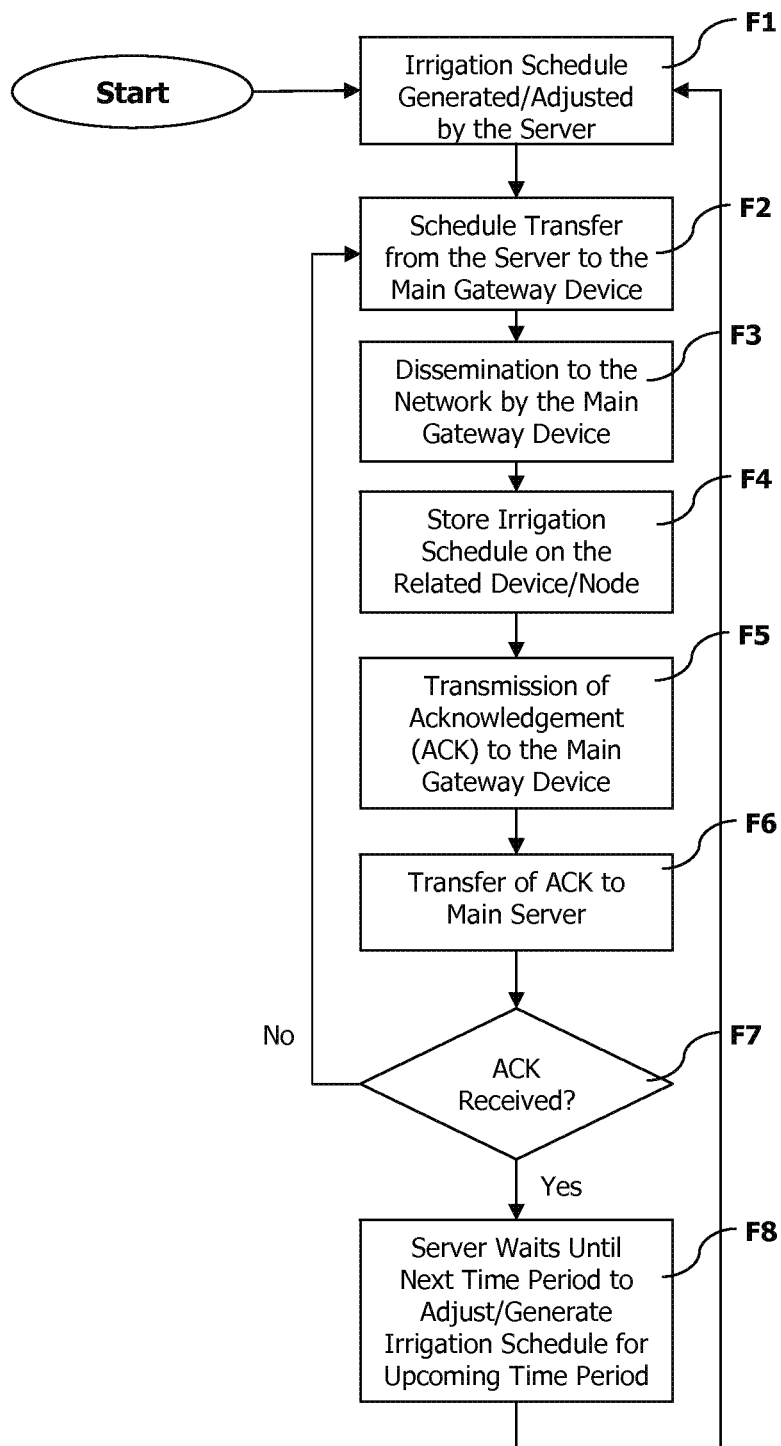
FIG. 9 is a flowchart illustrating an irrigation schedule dissemination process in accordance with one or more embodiments of the invention.

FIG. 9 is a flowchart illustrating an irrigation schedule dissemination process in accordance with one or more embodiments of the invention.

At step (F1), an irrigation schedule is generated/adjusted by the server as illustrated in FIG. 8. The schedule for the following time period (e.g., 7 days) is sent to the network through main gateway on a daily basis (or other appropriate frequency) at step (F2). The main gateway disseminates the schedule in the network at step (F3). The related wireless control node receives and stores the schedule, e.g., in an internal flash memory at step (F4). At steps (F5 and F6), the node acknowledges (ACK) the server about receiving and storing the schedule through main gateway. At step (F7), if the server doesn't receive the ACK, the process goes back to step (F2) to resend the schedule. Once the schedule is successfully stored in the node, the server sends periodical updates on the schedule to the node at step (F8).

Figure 10:
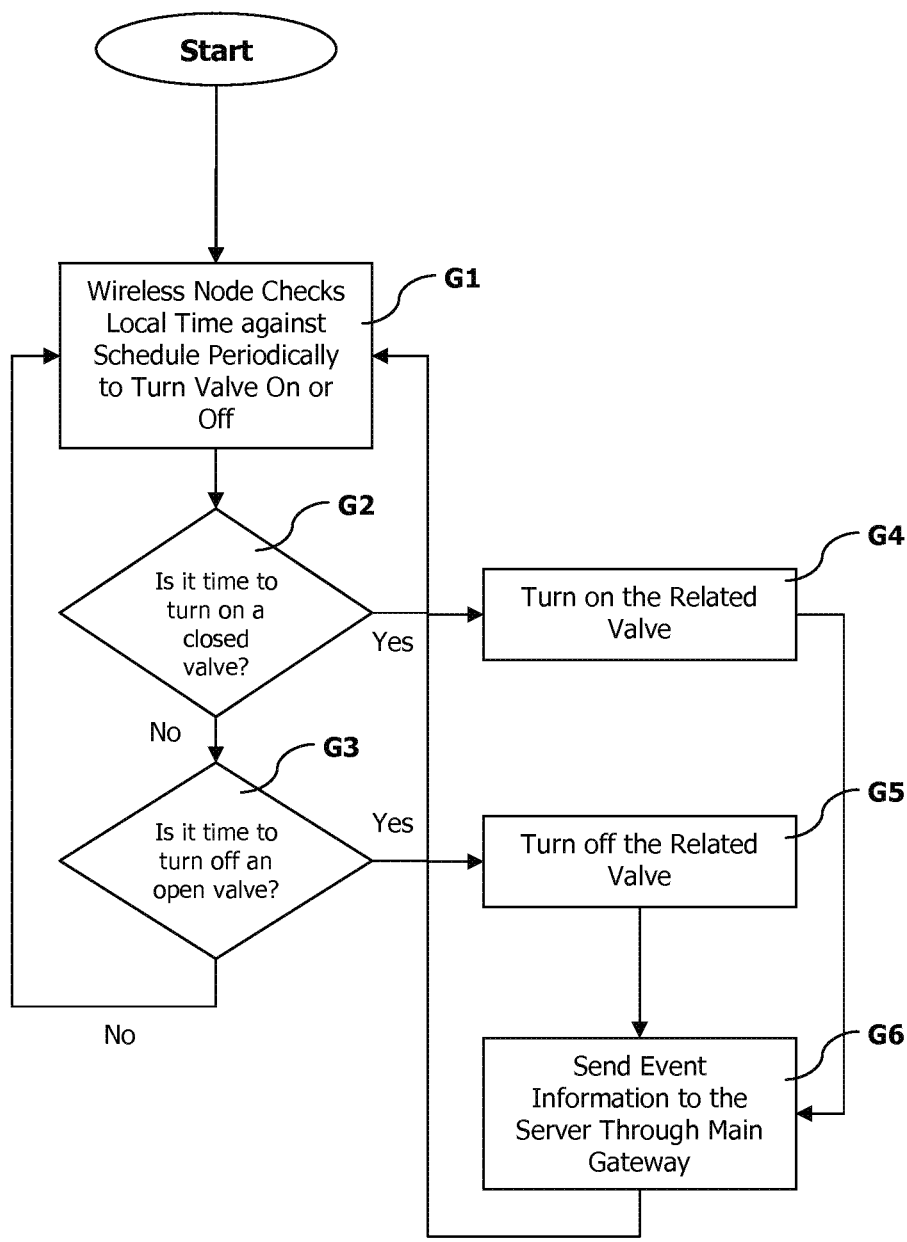
FIG. 10 is a flowchart illustrating an irrigation scheduling execution process in accordance with one or more embodiments of the invention.

FIG. 10 is a flowchart illustrating the irrigation scheduling execution process in accordance with one or more embodiments of the invention.

At step (G1) the control node checks its local time and compares it to the schedule condition and decides when to turn the valve on or off. If it is time to turn on a closed valve (G2), it turns on that particular valve at step (G4) and notifies the server about that event through main gateway at step (G6). If it is time to turn off an open valve (G3), it turns off that particular valve at step (G5) and notifies the server about that event through main gateway at step (G6).

Figure 11:
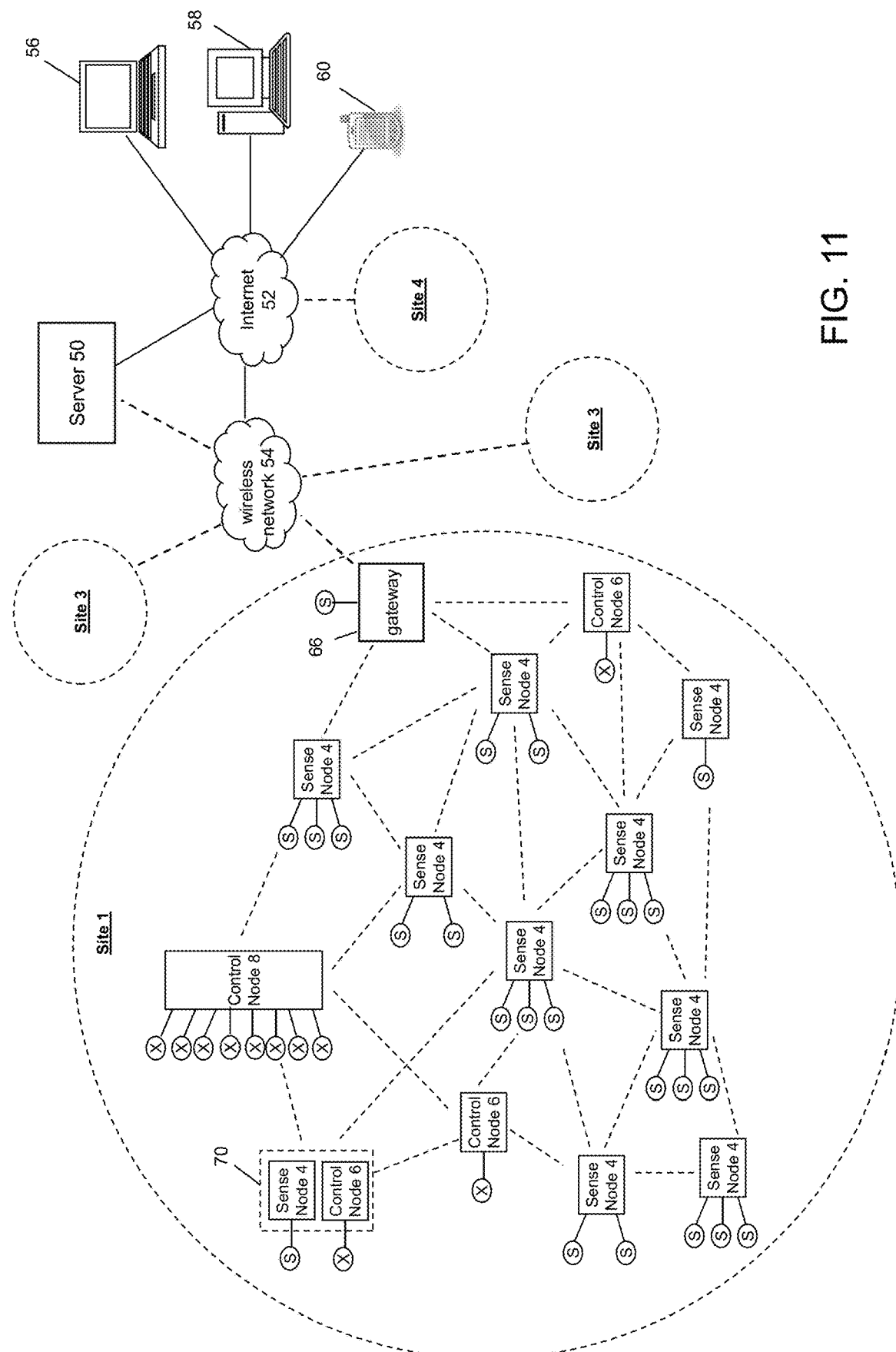
FIG. 11 is a schematic diagram illustrating a remote wireless monitoring and control system in accordance with one or more embodiments of the invention.

FIG. 11 is a schematic diagram illustrating a remote wireless monitoring and control system in accordance with one or more embodiments of the invention. The remote server 50 provides end-users access to one or more sites 1, 2, 3, 4, etc., for which the given user is authorized. Typically, users access the server 50 from remote user devices, such as a notebook or laptop computer 56, desktop computer 58 or mobile computer device 60, such as a smartphone or tablet computer. User devices can connect to the server 50 via the Internet 52 and/or other network (e.g., local or wide area networks). The server 50 is communicationally coupled to devices (e.g., gateway 66) at the various site via the Internet 52, wireless network 54 (e.g., a cellular or satellite network) and/or other wired or wireless network. At any given site, there may be one or more sensor nodes or devices 4 and/or control nodes or devices 6, controllers or elements. These devices are separately illustrated, however, it is understood that a device may include both sensor and control functionality. For example, item 70 illustrates a sensor node 4 and a separate adjacent control node 6 that cooperates with the given sensor node 4. Item 70 may also illustrate that the device or node 70 is functionally both a sense node 4 and a control node 6. A sensor node or device (e.g., node 4) is coupled to a sensor and receives sensor data. A control node or device (e.g., node 6) is coupled to and controls at least a portion of the irrigation or climate system, e.g., at least one node (e.g., control node 6) is coupled to an irrigation valve controlling the flow of water therethrough. It is understood that the number of devices at a given site depends on the needs of the irrigation site, e.g., a given site may have 1-n devices, each having sensor and/or control functionality. Further, the server 50 may communicate with local devices at the site through the gateway 66 or other router or network adapter. Furthermore, although all communication paths within the site are illustrated as wireless paths, one or more may be wired connections.

Figure 12:
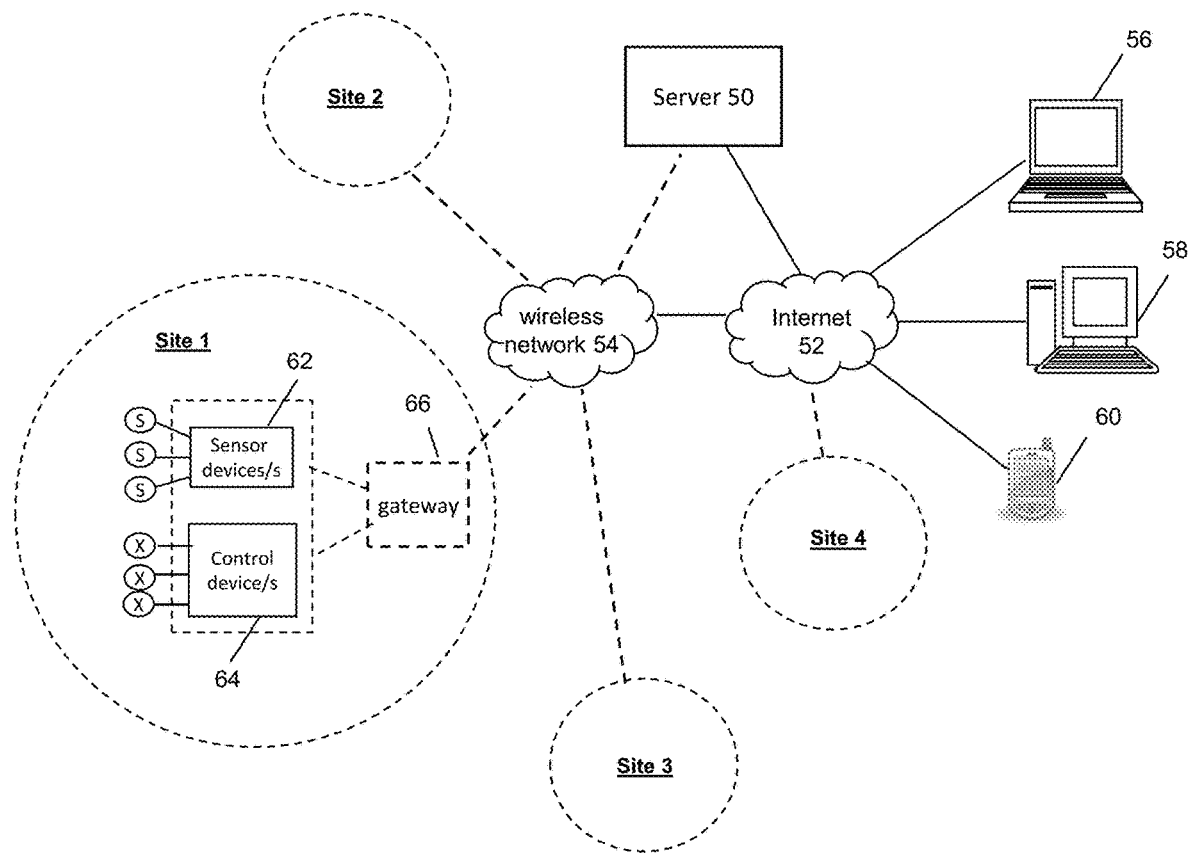
FIG. 12 is a schematic diagram illustrating another remote wireless monitoring and control system in accordance with one or more embodiments of the invention.

FIG. 12 is a schematic diagram illustrating another remote wireless monitoring and control system in accordance with one or more embodiments of the invention. The diagram of FIG. 12 is a more generic version of the diagram of FIG. 11. At any given site, there may be one or more sensor devices 62 and/or control devices 64, controllers or elements. These devices are separately illustrated, however, it is understood that a device may include both sensor and control functionality. At least one node or device (e.g., device 64) is coupled to a sensor and receives sensor data. At least one node or device is coupled to and controls at least a portion of the irrigation or climate system, e.g., at least one node (e.g., control device 64) is coupled to an irrigation valve controlling the flow of water therethrough. In some cases, a given node or device is a control only device or the node or device is a sensor only device. In other cases, a given node device is both a sensor device and control node device. It is understood that the number of devices at a given site depends on the needs of the irrigation site, e.g., a given site may have 1-n devices, each having sensor and/or control functionality. Further, the server 50 may communicate with local devices at the site through a gateway 66 or other router or network adapter, or otherwise communicate directly with the devices without passing through the gateway 66.

Thus, in a general sense, the various methods and systems described herein are applicable to a variety of irrigation and/or climate monitoring and/or control systems, such that authorized users are provided remote access to information from the system/s and/or to remotely control the system/s via interaction with a configurable user interface provided by a server system, such as server 50 (or server 4), in communication with the local system/s. Typically, the server is coupled to a wide area network accessible by the remote users, e.g., coupled to the Internet. The server 50 stores user information, user login and authorization information and system information for many irrigation and/or climate monitoring and/or control systems located at various sites. The server 50 manages access to such sites allowing users only to get access to those systems and sites that the particular user is so authorized, and is not provided access to those systems and sites that the user particular user is not so authorized. Further details of a configurable user interface allowing remote user access to view data and/or control devices or nodes at one or more sites that a user is so authorized is described in U.S. application Ser. No. 13/532, 557 filed Jun. 25, 2012 and entitled METHODS AND SYSTEMS FOR IRRIGATION AND CLIMATE CONTROL, and in U.S. application Ser. No. TBD, filed Mar. 15, 2013, entitled METHODS AND SYSTEMS FOR IRRIGATION AND CLIMATE CONTROL, both of which are incorporated herein by reference.

The following processes may be applicable to any of the systems described herein or in other irrigation and/or climate monitoring and/or control systems.

Figure 13:
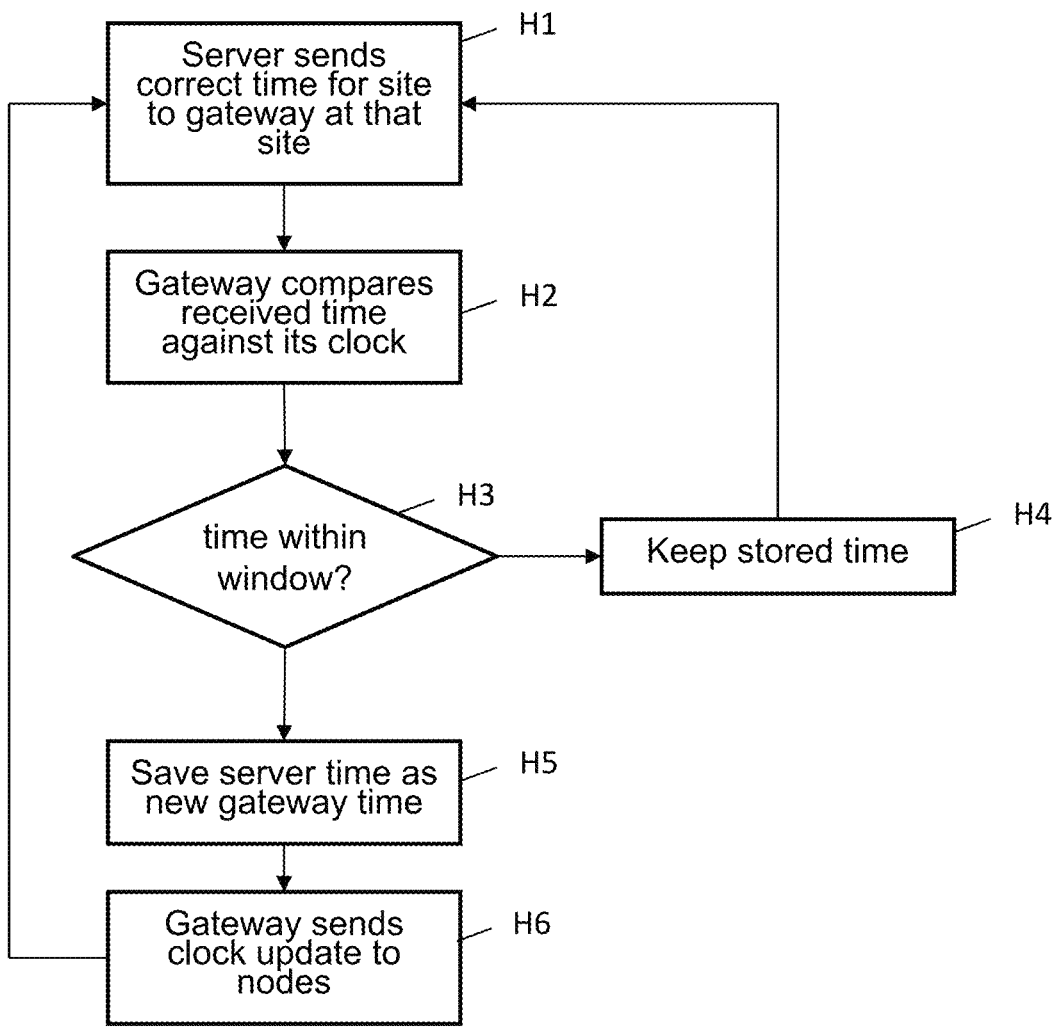
FIG. 13 is a flowchart illustrating a clock synchronization process between a remote server and a local device at a given site in accordance with one or more embodiments of the invention.

FIG. 13 is a flowchart illustrating a clock synchronization process between a remote server and a local device at a given site in accordance with one or more embodiments of the invention. At (H1), the server (e.g., server 14, 50) periodically sends the correct time to at least one local device (e.g., gateway 66) at a given site. For example, the server knows what time zone the given site is in, and sends the correct time for that time to the gateway. The period of this synchronization may vary depending on the implementation. At step (H2), the gateway receives the correct time and compares the received time against its clock. If the gateway time is within a given window about the server time (H3), the gateway keeps its time and does not make any changes (H4). If the gateway time is outside of the given window about the server time (H3), the gateway saves the received server time as it new gateway time (H5). Next, the gateway sends a clock update to the other local devices (e.g., sensor and/or control nodes or devices), which overwrite their time with the new gateway time. It is understood that the given window or margin about the server time that will trigger step (H5) will vary depending on the implementation and the need for accuracy in the synchronization. In some embodiments, the given window may be between 1 and 100 minutes.

Figure 14:
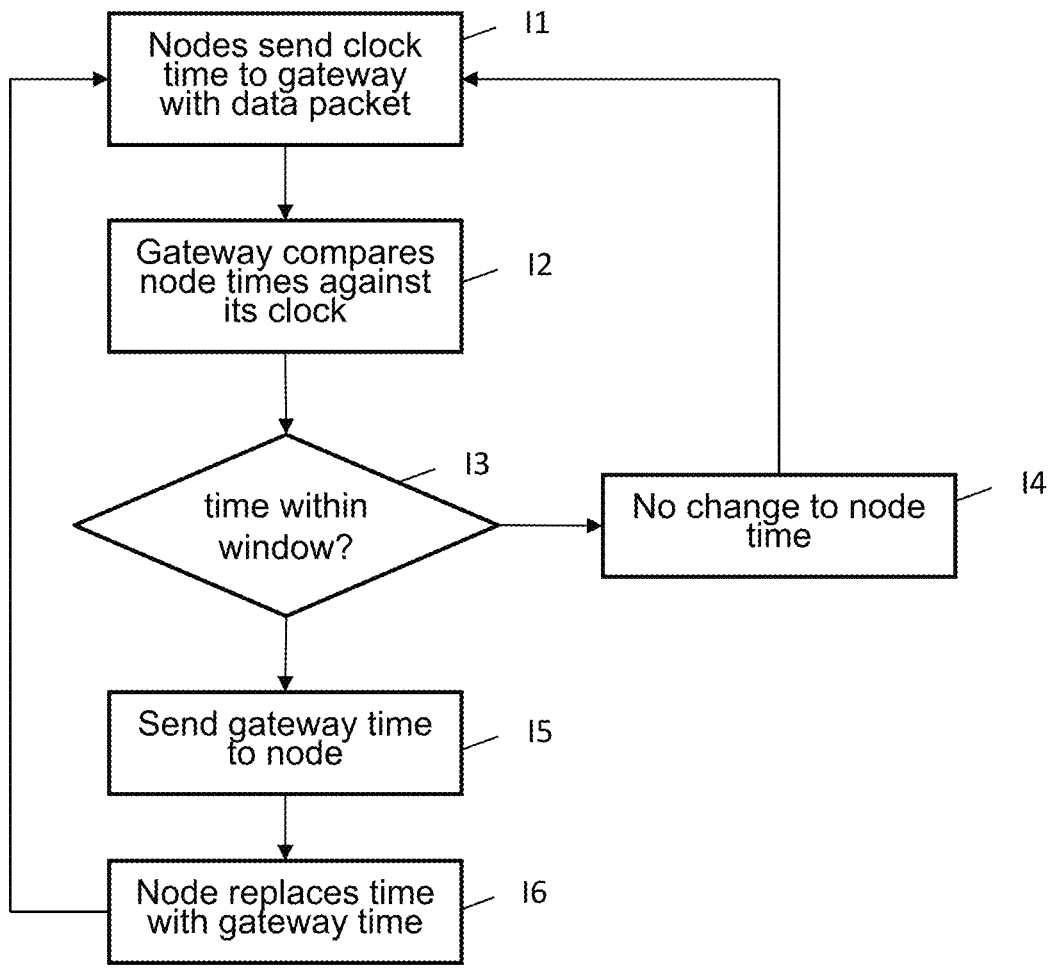
FIG. 14 is a flowchart illustrating a clock synchronization process between local devices at a site in accordance with one or more embodiments of the invention.

FIG. 14 is a flowchart illustrating a clock synchronization process between local devices at a site in accordance with one or more embodiments of the invention. At steep (I1), the various devices or nodes send their time or clock to the gateway as part of the regular data packet/s sent to the gateway. Thus, a separate clock data signal is not needed. For example, in some embodiments, all data communications from a given node to the gateway includes the time stamp of the node. At step (I2), the gateway compares the received node time against its clock. If the node time is within a given window about the gateway time (I3), the gateway does not make any changes to the node time (I4). If the node time is outside of the given window about the gateway time (I3), the gateway sends its time to the node (I5) and the node saves the received gateway time as it new node time (I6). Again, it is understood that the given window or margin about the gateway time that will trigger step (I5) will vary depending on the implementation and the need for accuracy in the synchronization.

Figure 15:
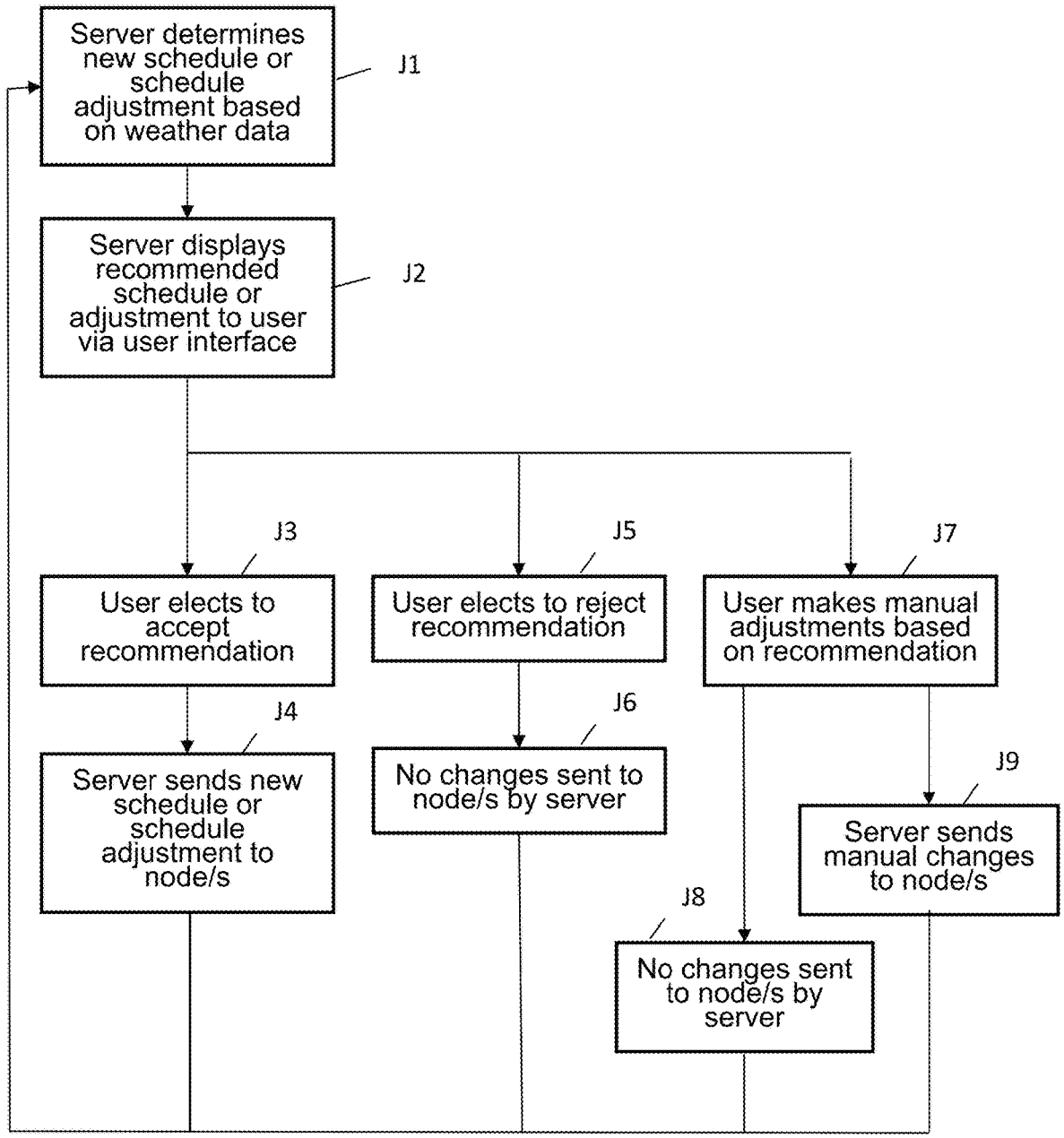
FIG. 15 is a flowchart illustrating a schedule adjustment recommendation process in accordance with one or more embodiments of the invention.

FIG. 15 is a flowchart illustrating a schedule adjustment recommendation process in accordance with one or more embodiments of the invention. In these embodiments, generally, the server (or alternatively a local sensor and/or control device) can determine new irrigation or climate control schedules and/or schedule adjustments. For example, such new schedules or adjustments may be based on weather data, such as ET data, taking into account irrigation that has occurred and/or any other parameters described herein or otherwise understood in the art. In these embodiments, users remotely accessing a given site are provided access to recommended new schedules and/or schedule adjustments and given the opportunity to accept or reject them, or make other manual adjustments given the recommendation.

For example, in the exemplary process of FIG. 15, the server (e.g., server 14, 50, or alternatively and other sensor or control device or node) determines a new schedule or a schedule adjustment (J1). The schedule or adjustment is not automatically implemented, rather the schedule or recommendation is presented to the user. For example, the server causes the display of the recommended schedule or adjustment to the remote user via a user interface displayed at the remote device (e.g., devices 56, 58, 60) (J2). Such user interface may be displayed as served by the server (e.g., using HTML pages), or may generated by a local application running on the remote device and receiving data from the server. An example, may be that given the weather for the pat x days and the current weather at the site, and given the amount of recent irrigation at the site and currently scheduled irrigation, it is recommended that irrigation of y minutes/hours occur on z day/s (or that runtimes be reduced/increased by y minutes/hours on z day/s. The server may be able to calculate such values where user input valve and irrigating device flow rates. Accordingly, in some embodiments, the recommendation is a new schedule defining watering days and runtimes (and optionally start times, cycle and soak periods, etc.). In other embodiments, the recommendation is a recommended increase or decrease in run times for given day/s, or the elimination of irrigation on a given day.

Since the schedule or recommendation is not automatically implemented, the user or grower has several options available. In some embodiments, the user accepts the recommended new schedule or adjustment (J3) and the server sends the new schedule or adjustment to the node/s or device/s at the site that will implement the recommendation (J4). For example, to accept, the user may click to accept and execute the recommendation. As a further option, the user rejects the recommended new schedule or adjustment (J5) and not changes are made or sent from the server (J6). For example, to reject, the user may click to reject the recommendation and the server stores the rejection. As a further option, in some embodiments, the user may reject or otherwise ignore the recommendation, but otherwise manually inputs a new schedule or schedule adjustment via the user interface and/or directly at the control device/s (J7). In doing, the user may choose between making manual adjustments (J7) and no changes are sent to the node/s by the server (J8), or the user can make the manual adjustments (J7) via the user interface and the server will send those manual adjustments to the node/s (J9). In this way, the user can make decisions factoring other information not considered in the recommendation. For example, perhaps the servers recommends an increase in irrigation, but the user knows that rain fall is forecast on that day, and so the change is not implemented. This provides the user the ability to accept the recommended guidance when it makes sense, but also the flexibility to not have such changes be fully automated so that the user can factor in other consideration and otherwise apply the user's knowledge of the site and its needs. This is in contrast to know automated weather adjusting control systems that automatically implement calculated changes.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Method claims set forth below having steps that are numbered or designated by letters should not be considered to be necessarily limited to the particular order in which the steps are recited.

What is claimed is:

1. A system for controlling an irrigation control system at an agricultural or a landscape site, comprising:
   at least one wireless control node at a site;
   a server computer located remotely from the site, said server computer communicationally coupled to each of the at least one wireless control node over a communications network for receiving data from and transmitting data to the at least one wireless control node at the site, said server computer coupled to a device operated by an end-user over the communications network for transmitting the data to and receiving remote control commands or queries from the end-user; and
   a web based application or a cell phone application configured to operate on a device operated by the end-user, to couple to a communications network, and to provide an end-user interface for the end-user, the end-user having authorization to access the at least one wireless control node; and
   at least one gateway, at a location of the site, for transferring the data between the at least one wireless control node via a local wireless network and the server computer via the communications network;
   wherein the server computer generates and transfers an irrigation schedule to the at least one wireless control node for storage and execution by the at least one wireless control node at the site;
   wherein the at least one wireless control node receives at least one user-entered command entered via the web based application or the cell phone application on the device, and control irrigation accordingly, wherein the at least one user-entered command is transferred from the server computer to the at least one wireless control node;
   wherein the server computer communicates with and responds to queries from the end-user with short text messages (SMS), web pages, or screens to be displayed on the web based application or the cell phone application;
   wherein the at least one wireless control node communicates with and directly controls the operation of valves or pumps without a central controller.

2. The system of claim 1, wherein said at least one gateway disseminates control commands from the server computer to the at least one wireless control node.

3. The system of claim 1, wherein the server computer communicates with the at least one wireless control node through an Internet or a cellular network.

4. The system of claim 1, wherein the server computer transmits measurements from the at least one wireless control node to the web based application or the cell phone application via an Internet or a cellular network.

5. The system of claim 1, wherein the irrigation control system includes a pump, solenoid or other types of valves, or fertigation devices.

6. The system of claim 1, wherein the at least one wireless control node at the site form an ad-hoc dynamic wireless mesh network comprising a plurality of mesh nodes, wherein the at least one wireless control node comprises a mesh node, wherein the at least one wireless control node sends collected environmental, soil, or climate measurements to the at least one gateway by relaying data through a neighbor wireless node, and wherein the at least one wireless control node identifies the neighbor wireless node by determining which wireless node can be used to establish a highest quality data transfer link.

7. The system of claim 1 wherein the data comprises environmental, soil, or climate parameters include temperature, humidity, or soil moisture conditions.

8. The system of claim 1, wherein the communications network for transferring the data between the at least one gateway, the at least one wireless control node, and the server computer comprises a GPRS network, an Edge network, a 3G network, a UMTS network, a cellular network, a wireless broadband data communication service, or WiMAX.

9. The system of claim 1, wherein the server computer determines the irrigation schedule for the at least one wireless control node at the site based on historical evapotranspiration (ET) data and information on crops or soil at the site.

10. The system of claim 9, wherein the server computer adjusts the irrigation schedule for a given period of time based on ET data at the site for an immediate prior period of time.

11. The system of claim 9, wherein the server computer adjusts the irrigation schedule based on soil moisture readings from the at least one wireless control node at the site.

12. The system of claim 9, wherein the server computer adjusts the irrigation schedule based on irrigation flow readings from one or more flow nodes at the site.

13. The system of claim 9, wherein the server computer adjusts the irrigation schedule based on weather forecast information.

14. The system of claim 1, wherein the server computer analyzes soil condition data received from the at least one wireless control node and generates recommended upper and lower threshold values for starting and stopping the irrigation, and wherein the end-user is provided with an option of accepting or modifying recommended values.

15. The system of claim 1 wherein the server computer transmits a correct time for a given site to the at least one gateway, and wherein the at least one gateway compares its time against the received correct time, and accepts the correct time as a new gateway time in an event a difference there between is outside of a given time window.

16. The system of claim 1 wherein the web based application or the cell phone application on the device is configured to allow the end-user to input a new irrigation schedule or a schedule adjustment for the at least one wireless control node to be transmitted to the server computer.

* * * * *

UNITED STATES PATENT AND TRADEMARK OFFICE
CERTIFICATE OF CORRECTION

PATENT NO. : 10,716,269 B2
APPLICATION NO. : 16/452397
DATED : July 21, 2020
INVENTOR(S) : Bulut F. Ersavas, Semih Pekol and Atakan Bodur Page 1 of 1

It is certified that error appears in the above-identified patent and that said Letters Patent is hereby corrected as shown below:

On the Title Page

Column 1, below (63) Related U.S. Application Data, insert --(30) Foreign Application Priority Data Aug. 12, 2008 (TR) 2008/05998 Feb. 05, 2009 (TR) 2009/00883--, as a new field entry.

Column 1, page 2, (63) Related U.S. Application Data, Line 9, delete "is a continuation of application No. 12/537,772, filed" and insert --is a continuation-in-part of application No. 12/537,772, filed--, therefor.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*